(12) United States Patent
Yu et al.

(10) Patent No.: US 12,163,238 B2
(45) Date of Patent: Dec. 10, 2024

(54) HYDROGEN PRODUCTION SYSTEM AND METHOD FOR CONTROLLING THE SAME

(71) Applicant: Sungrow Hydrogen Sci. & Tech. Co., Ltd., Hefei (CN)

(72) Inventors: Deye Yu, Hefei (CN); Yu Gu, Hefei (CN); Yan Zhang, Hefei (CN)

(73) Assignee: Sungrow Hydrogen Sci.&Tech. Co., Ltd., Hefei (CN)

( * ) Notice: Subject to any disclaimer, the term of this patent is extended or adjusted under 35 U.S.C. 154(b) by 765 days.

(21) Appl. No.: 17/411,439

(22) Filed: Aug. 25, 2021

(65) Prior Publication Data

US 2022/0064810 A1 Mar. 3, 2022

(30) Foreign Application Priority Data

Aug. 27, 2020 (CN) .......................... 202010878657.3

(51) Int. Cl.
*C25B 15/08* (2006.01)
*C25B 1/04* (2021.01)
*C25B 15/029* (2021.01)

(52) U.S. Cl.
CPC .............. *C25B 15/085* (2021.01); *C25B 1/04* (2013.01); *C25B 15/029* (2021.01)

(58) Field of Classification Search
CPC ....... C25B 1/04; C25B 15/085; C25B 15/029; C25B 15/00; C25B 15/023; C25B 15/083; C25B 15/087; C25B 15/02; C25B 15/08
See application file for complete search history.

(56) References Cited

U.S. PATENT DOCUMENTS

2022/0106695 A1* 4/2022 Uchino ..................... C25B 9/75

FOREIGN PATENT DOCUMENTS

| CN | 102135529 A | 7/2011 |
| CN | 102586797 A | 7/2012 |

(Continued)

OTHER PUBLICATIONS

Extended European Search Report for European Application No. 21193261.1, dated Jan. 25, 2022.

(Continued)

*Primary Examiner* — Luan V Van
*Assistant Examiner* — Mofoluwaso S Jebutu
(74) *Attorney, Agent, or Firm* — Wolf, Greenfield & Sacks, P.C.

(57) ABSTRACT

A hydrogen production system and a method for controlling the same are provided. A renewable energy power generation system supplies electric energy to a hydrogen production device. The hydrogen production device discharges acceptable-purity hydrogen to the main hydrogen branch and discharges unacceptable-purity hydrogen to the mixed hydrogen branch. The mixed hydrogen branch receives high-purity hydrogen. The mixed hydrogen branch includes two valves to respectively control volumes of the high-purity hydrogen and the unacceptable-purity hydrogen flowing into the hydrogen mixing device in the mixed hydrogen branch, to control mixed hydrogen in the hydrogen mixing device to be the acceptable-purity hydrogen. The acceptable-purity hydrogen in the hydrogen mixing device is discharged to a purification branch in the main hydrogen branch, or a purification branch in the mixed hydrogen branch.

20 Claims, 6 Drawing Sheets

(56) References Cited

FOREIGN PATENT DOCUMENTS

| CN | 203049045 U | 7/2013 | | |
|---|---|---|---|---|
| CN | 110273163 A | 9/2019 | | |
| CN | 111364053 A | 7/2020 | | |
| WO | WO-2004041715 A1 * | 5/2004 | ............. | B01J 19/02 |
| WO | WO 2020/095664 A1 | 5/2020 | | |

OTHER PUBLICATIONS

Kirati et al., Hybrid energy system for hydrogen production in the Adrar region (Algeria): production rate and purity level. International Journal of Hydrogen Energy. Feb. 8, 2018;43(6):3378-93.

* cited by examiner

HYDROGEN PRODUCTION SYSTEM AND METHOD FOR CONTROLLING THE SAME

The present application claims priority to Chinese Patent Application No. 202010878657.3, titled "HYDROGEN PRODUCTION SYSTEM AND METHOD FOR CONTROLLING THE SAW", filed on Aug. 27, 2020 with the China National Intellectual Property Administration, which is incorporated herein by reference in its entirety.

FIELD

The present disclosure relates to the technical field of hydrogen production, and in particular to a hydrogen production system and a method for controlling the hydrogen production system.

BACKGROUND

As shown in FIG. 1, an existing hydrogen production system 1 includes an electrolytic cell 2, an anode chamber 2a of the electrolytic cell 2, an anode 8 of the anode chamber 2a, a diaphragm 10 of the electrolytic cell 2, a cathode chamber 2b of the electrolytic cell 2, a cathode 9 of the cathode chamber 2b, an oxygen flow path R1, a discharge outlet 11, a discharge outlet 12, a hydrogen flow path R2, a gas purity analyzer 3, a compressor 4, a refiner 5, a storage tank 6, a cathode gas discharge path R5, a nitrogen (N2) supply path R4, a nitrogen source 13, a control device 7 and regulation valves V1, V2, V3 and V4. Specially, direct current outputted from a renewable energy power generation system is directly inputted into the electrolytic cell 2. Electrolyte is decomposed on the anode 8 in the anode chamber 2a to generate oxygen, and hydrogen is generated on the cathode 9 in the cathode chamber 2b. During normal operation, the oxygen passes through the oxygen flow path R1 to the discharge outlet 11, and then is discharged from the hydrogen production system. The hydrogen flows into the gas purity analyzer 3 through the hydrogen flow path R2. Hydrogen having acceptable purity flows through the compressor 4 into the refiner 5 for deoxygenation and drying, and then is stored in the storage tank 6. Hydrogen has unacceptable purity flows through the regulation valve V2, the cathode gas discharge path R5 and the discharge outlet 12, and finally is discharged from the hydrogen production system.

A monitoring device monitors at least one of hydrogen concentration or oxygen concentration in gas from the cathode in the hydrogen flow path R2 and power supplied to the electrolytic cell 2. For example, the monitoring device monitors hydrogen concentration in the hydrogen flow path R2 upstream of the compressor 4 based on a result of the gas purity analyzer 3, and monitors the supplied power based on a result of a power meter arranged in the electrolytic cell 2. The monitoring device feeds back monitored data to the control device 7. The control device 7 controls the regulation valve based on the monitored data from the monitoring device.

However, hydrogen with high-purity is directly introduced into a path for generating unacceptable-purity hydrogen to improve purity of the acceptable-purity hydrogen according to existing solutions, which cannot ensure that purity of mixed hydrogen meets requirements of acceptable-purity hydrogen. In a case that the purity of the mixed hydrogen does not meet the requirements of the acceptable purity hydrogen, resulting in energy waste.

SUMMARY

In view of this, a hydrogen production system and a method for controlling the hydrogen production system are provided according to the present disclosure, to mix acceptable-purity hydrogen having unacceptable purity and hydrogen having high-purity, so that purity of the mixed hydrogen meets requirements of the acceptable-purity hydrogen, thereby improving the utilization of hydrogen energy.

A hydrogen production system is provided according to a first aspect of the present disclosure. The hydrogen production system includes a renewable energy power generation system, a hydrogen production device, a main hydrogen branch and a mixed hydrogen branch. The renewable energy power generation system is configured to supply electric energy to the hydrogen production device for hydrogen production. The hydrogen production device is configured to: discharge acceptable-purity hydrogen to a first gas inlet of the main hydrogen branch through a first gas outlet of the hydrogen production device; and discharge unacceptable-purity hydrogen to a first gas inlet of the mixed hydrogen branch through a second gas outlet of the hydrogen production device. The mixed hydrogen branch is configured to receive high-purity hydrogen through a second gas inlet of the mixed hydrogen branch. The mixed hydrogen branch includes two valves. One of the two valves is configured to control a volume of the high-purity hydrogen flowing into a hydrogen mixing device in the mixed hydrogen branch, and the other of the two valves is configured to control a volume of the unacceptable-purity hydrogen flowing into the hydrogen mixing device in the mixed hydrogen branch, to control mixed hydrogen in the hydrogen mixing device to be the acceptable-purity hydrogen. The acceptable-purity hydrogen in the hydrogen mixing device is discharged to a purification branch in the main hydrogen branch, or a purification branch in the mixed hydrogen branch.

In an embodiment, the system further includes at least one hydrogen storage device. The high-purity hydrogen is configured to receive high-purity hydrogen from at least one of the purification branch in the main hydrogen branch or the purification branch in the purification branch.

In an embodiment, the mixed hydrogen branch includes a recycling branch, and a feedback branch. The two valves includes a first valve and a second valve. The hydrogen mixing device is a hydrogen mixing tank. The hydrogen production device is configured to discharge the unacceptable-purity hydrogen to a first gas inlet of the hydrogen mixing tank through the second gas outlet of the hydrogen production device, the recycling branch and the first valve. The feedback branch is configured to convey the high-purity hydrogen to a second gas inlet of the hydrogen mixing tank through the second valve. A gas outlet of the hydrogen mixing tank is in communication with a second gas inlet of the main hydrogen branch, where the acceptable-purity hydrogen discharged from the hydrogen mixing tank is purified in the purification branch in the main hydrogen branch.

In an embodiment, the recycling branch includes an unacceptable-purity hydrogen collection tank and a third valve. The unacceptable-purity hydrogen collection tank is configured to receive the unacceptable-purity hydrogen through the third valve and a gas inlet of the unacceptable-purity hydrogen collection tank. A first gas outlet of the unacceptable-purity hydrogen collection tank is in communication with the first gas inlet of the hydrogen mixing tank through the first valve.

In an embodiment, the feedback branch includes a second hydrogen buffer tank and a fifth valve. The second hydrogen buffer tank is configured to receive the high-purity hydrogen through a gas inlet of the second hydrogen buffer tank and the fifth valve. A gas outlet of the second hydrogen buffer tank is in communication with the second gas inlet of the hydrogen mixing tank through the second valve.

In an embodiment, the mixed hydrogen branch includes a recycling branch, a feedback branch, a second hydrogen buffer tank and a purification branch. The two valves includes a first valve and a fifth valve. The second hydrogen buffer tank serves as the hydrogen mixing device. The hydrogen production device is configured to discharge the unacceptable-purity hydrogen to a first gas inlet of the second hydrogen buffer tank through the second gas outlet of the hydrogen production device, the recycling branch and the first valve. The feedback branch is configured to convey the high-purity hydrogen to a second gas inlet of the second hydrogen buffer tank through the fifth valve. The second hydrogen buffer tank is configured to discharge the acceptable-purity hydrogen through a gas outlet of the second hydrogen buffer tank, and the purification branch in the mixed hydrogen branch is configured to purify the acceptable-purity hydrogen discharged from a gas outlet of the second hydrogen buffer tank.

In an embodiment, the recycling branch includes an unacceptable-purity hydrogen collection tank, a third valve, a second hydrogen decompression unit, a second valve and a second one-way valve. The unacceptable-purity hydrogen collection tank is configured to receive the unacceptable-purity hydrogen through the third valve and a gas inlet of the unacceptable-purity hydrogen collection tank. A first gas outlet of the unacceptable-purity hydrogen collection tank is in communication with a gas inlet of the second hydrogen decompression unit through the first valve. A gas outlet of the second hydrogen decompression unit is in communication with the first gas inlet of the second hydrogen buffer tank through the second valve and the second one-way valve.

In an embodiment, the feedback branch includes a pipeline configured to receive the high-purity hydrogen.

In an embodiment, a hydrogen purity analyzer is provided in the hydrogen mixing device. The first valve is controlled based on a measurement result of the hydrogen purity analyzer.

In an embodiment, the feedback branch further includes a first hydrogen decompression unit and a fourth valve. The second hydrogen buffer tank is configured to receive the high-purity hydrogen from the main hydrogen branch through the fourth valve, the first hydrogen decompression unit and the fifth valve.

In an embodiment, a sixth valve is arranged between the hydrogen storage device and a gas outlet of the main hydrogen branch.

In an embodiment, a hydrogen purity analyzer is arranged in the unacceptable-purity hydrogen collection tank. The unacceptable-purity hydrogen collection tank is configured to discharge hydrogen out of the hydrogen production system through a second gas outlet of the unacceptable-purity hydrogen collection tank and a safety valve.

In an embodiment, a hydrogen purity analyzer is arranged in the hydrogen production device. The third valve is controlled based on a measurement result of the hydrogen purity analyzer in the hydrogen production device. The hydrogen production device is configured to discharge hydrogen out of the hydrogen production system through a third gas outlet of the hydrogen production device.

In an embodiment, the purification branch in the mixed hydrogen branch includes an eleventh valve, a second hydrogen purification device, a tenth valve and a third one-way valve. A gas inlet of the second hydrogen purification device is in communication with the gas outlet of the second hydrogen buffer tank through the eleventh valve. A gas outlet of the second hydrogen purification device is in communication with a gas inlet of the hydrogen storage device through the tenth valve and the third one-way valve.

In an embodiment, the main hydrogen branch includes a seventh valve, a first hydrogen buffer tank, an eighth valve, a first hydrogen purification device and a ninth valve. A gas inlet of the seventh valve serves as the first gas inlet of the main hydrogen branch. A first gas inlet of the first hydrogen buffer tank is in communication with a gas outlet of the seventh valve. A gas outlet of the first hydrogen buffer tank is in communication with a gas inlet of the first hydrogen purification device through the eighth valve. A second gas inlet of the first hydrogen buffer tank serves as the second gas inlet of the main hydrogen branch. A gas outlet of the first hydrogen purification device is in communication with a gas inlet of the hydrogen storage device through the ninth valve.

In an embodiment, the main hydrogen branch includes a seventh valve, a first hydrogen buffer tank, an eighth valve, a first hydrogen purification device, a ninth valve and a first one-way valve. A gas inlet of the seventh valve serves as the first gas inlet of the main hydrogen branch. A first gas inlet of the first hydrogen buffer tank is in communication with a gas outlet of the seventh valve. A gas outlet of the first hydrogen buffer tank is in communication with a gas inlet of the first hydrogen purification device through the eighth valve. The first hydrogen purification device is configured to discharge the high-purity hydrogen through a gas outlet of the first hydrogen purification device, and the gas outlet of the first hydrogen purification device is in communication with a gas inlet of one of the at least one hydrogen storage device through the ninth valve and the first one-way valve.

A method for controlling a hydrogen production system is provided according to a second aspect of the present disclosure. The method is applied to the hydrogen production system according to the first aspect of the present disclosure. The method for controlling a hydrogen production system includes: receiving high-purity hydrogen and unacceptable-purity hydrogen by a hydrogen mixing device in a mixed hydrogen branch of the hydrogen production system; determining whether hydrogen in the hydrogen mixing device meets requirements of acceptable-purity hydrogen; stopping receiving the unacceptable-purity hydrogen by the hydrogen mixing device when the hydrogen in the hydrogen mixing device meets the requirements of the acceptable-purity hydrogen; and stopping receiving the high-purity hydrogen by the hydrogen mixing device.

In an embodiment, the hydrogen mixing device stops receiving the unacceptable-purity hydrogen and the high-purity hydrogen simultaneously. Alternatively, the hydrogen mixing device stops receiving the high-purity hydrogen after stopping receiving the unacceptable-purity hydrogen.

In an embodiment, after the stopping receiving the high-purity hydrogen, the method further includes: discharging, when a pressure of the hydrogen in the hydrogen mixing device is stable, the hydrogen from the hydrogen mixing device to a gas inlet of the purification branch in the main hydrogen branch of the hydrogen production system, or to a gas inlet of the purification branch in the mixed hydrogen branch.

In an embodiment, a hydrogen purity analyzer is arranged in a hydrogen production device of the hydrogen production system. The method further includes: discharging, in a case that the hydrogen in the hydrogen production device is the acceptable-purity hydrogen, the acceptable-purity hydrogen from the hydrogen production device to the main hydrogen branch of the hydrogen production system through a first gas outlet of the hydrogen production device. Before receiving high-purity hydrogen and unacceptable-purity hydrogen by a hydrogen mixing device in a mixed hydrogen branch of the hydrogen production system, the method further includes: discharging, in a case that the hydrogen in the hydrogen production device is the unacceptable-purity hydrogen, the unacceptable-purity hydrogen from the hydrogen production device to a recycling branch of the hydrogen production system through a second gas outlet of the hydrogen production device.

In an embodiment, the method further includes: discharging, in a case that the concentration of the hydrogen in the hydrogen production device is less than a preset unacceptable-purity hydrogen concentration, the hydrogen from the hydrogen production system through a third gas outlet of the hydrogen production device.

In an embodiment, a hydrogen purity analyzer is arranged in an unacceptable-purity hydrogen collection tank of the recycling branch of the hydrogen production system. After the unacceptable-purity hydrogen collection tank receives the hydrogen, the method further includes: discharging, in a case that concentration of the hydrogen in the unacceptable-purity hydrogen collection tank is less than the preset unacceptable-purity hydrogen concentration, the hydrogen in the unacceptable-purity hydrogen collection tank from the hydrogen production system through a second gas outlet of the unacceptable-purity hydrogen collection tank; and discharging, in a case that concentration of the hydrogen in the unacceptable-purity hydrogen collection tank is greater than or equal to the preset unacceptable-purity hydrogen concentration, the hydrogen in the unacceptable-purity hydrogen collection tank through a first gas outlet of the unacceptable-purity hydrogen collection tank and a first valve of the hydrogen production system to a first gas inlet of the hydrogen mixing device.

It can be seen from the above technical solutions that, a hydrogen production system is provided according to the present disclosure. The renewable energy power generation system supplies electric energy to the hydrogen production device for hydrogen production. The hydrogen production device discharges acceptable-purity hydrogen to a first gas inlet of the main hydrogen branch through a first gas outlet of the hydrogen production device and discharges unacceptable-purity hydrogen to a first gas inlet of the mixed hydrogen branch through a second gas outlet of the hydrogen production device. The mixed hydrogen branch receives high-purity hydrogen through a second gas inlet of the mixed hydrogen branch. The mixed hydrogen branch includes two valves. One of the two valves is configured to control a volume of the high-purity hydrogen flowing into a hydrogen mixing device in the mixed hydrogen branch, and the other of the two valves is configured to control a volume of the unacceptable-purity hydrogen flowing into the hydrogen mixing device in the mixed hydrogen branch, to control mixed hydrogen in the hydrogen mixing device to be the acceptable-purity hydrogen. The acceptable-purity hydrogen discharged from the hydrogen mixing device flows to a purification branch in the main hydrogen branch, or a purification branch in the mixed hydrogen branch. The concentration of the hydrogen discharged from the hydrogen mixing device meets requirements of the acceptable-purity hydrogen due to the two valves arranged in the mixed hydrogen branch, thereby improving utilization of hydrogen energy.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure. For those skilled in the art, other drawings may be obtained based on the provided drawings without any creative work.

DETAILED DESCRIPTION

In order to make objects, technical solutions and advantages of embodiments of the present disclosure clearer, the technical solutions of the embodiments of the present disclosure are described clearly and completely in conjunction with the drawings in the embodiments of the present disclosure hereinafter. It is apparent that the described embodiments are only some rather than all embodiments of the present disclosure. All other embodiments obtained by those skilled in the art based on the embodiments of the present disclosure without any creative work fall within the protection scope of the present disclosure.

In the present disclosure, terms of "include", "comprise" or any other variants are intended to be non-exclusive. Therefore, a process, method, article or device including multiple elements includes not only the elements but also other elements that are not enumerated, or also includes the elements inherent for the process, method, article or device. Unless expressively limited otherwise, the statement "comprising (including) one . . . " does not exclude the case that other similar elements may exist in the process, method, article or device.

A hydrogen production system is provided according to an embodiment of the present disclosure, to solve the problem of energy waste due to mixed hydrogen having unacceptable purity acceptable-purity in the existing solutions that hydrogen having high-purity is directly introduced into a path generating acceptable-purity hydrogen having unacceptable purity to improve purity of the acceptable-purity-hydrogen having unacceptable purity.

Figure 1:
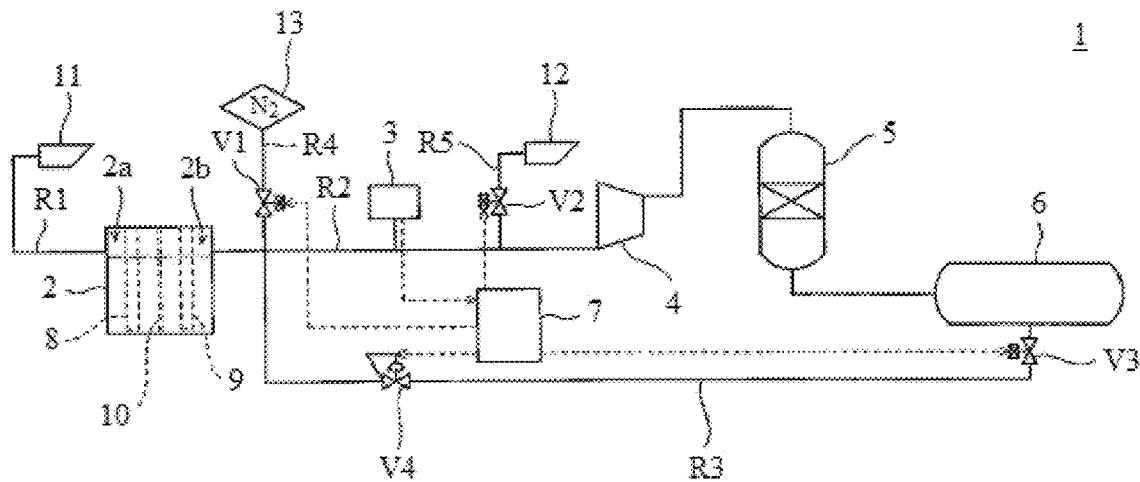
FIG. 1 is a schematic diagram of a hydrogen production system according to the conventional technology.
Figure 2:
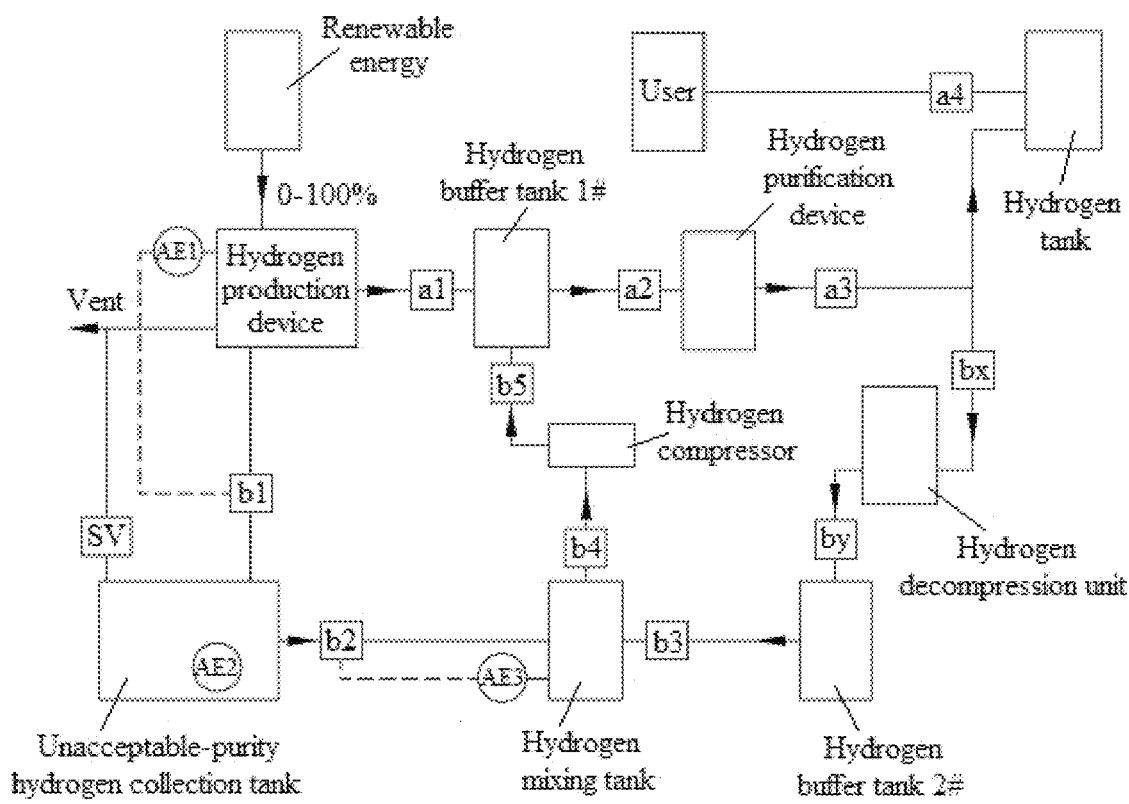
FIG. 2 is a schematic diagram of a hydrogen production system according to an embodiment of the present disclosure.
Figure 3:
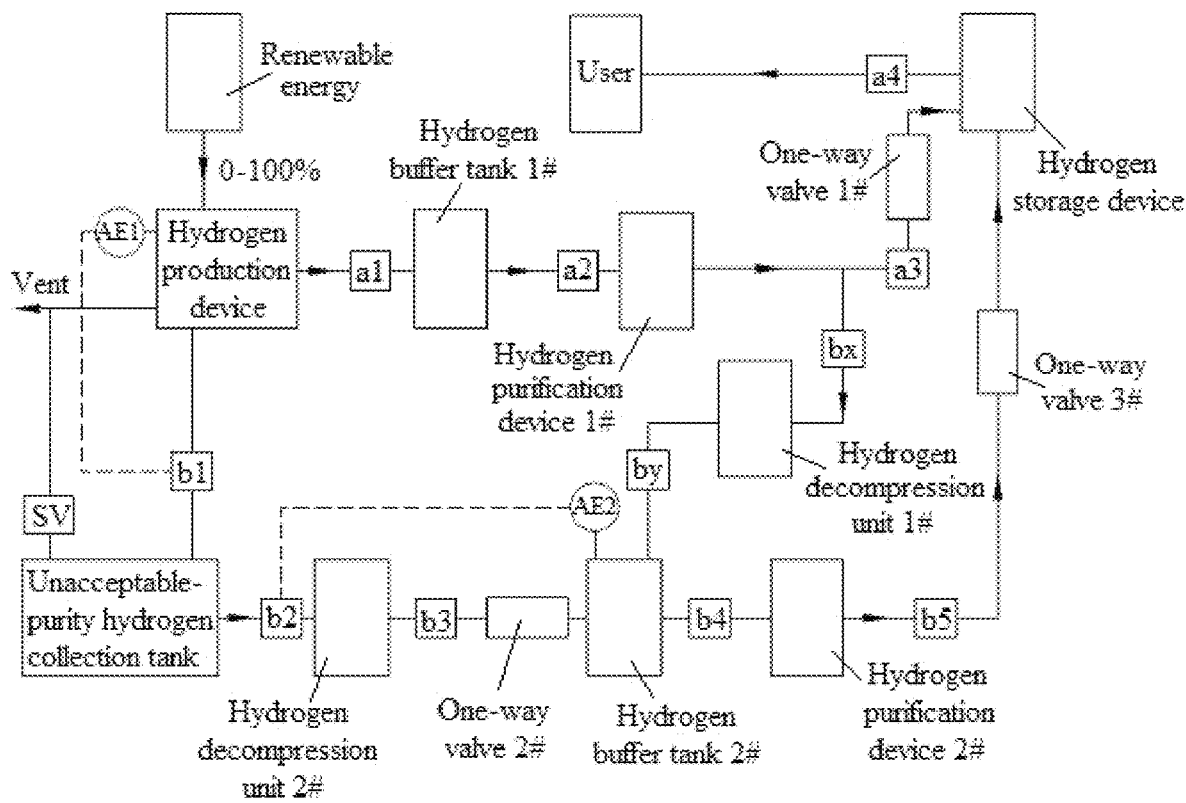
FIG. 3 is a schematic diagram of a hydrogen production system according to another embodiment of the present disclosure.

As shown in FIGS. 2 and 3, the hydrogen production system includes a renewable energy power generation system (represented by renewable energy in FIG. 2 and FIG. 3), a hydrogen production device, a main hydrogen branch (including valves a1, a2 and a3, a hydrogen buffer tank and a hydrogen purification device as shown in FIG. 2, or including valves a1, a2 and a3, a hydrogen buffer tank 1#, a first hydrogen purification device and a one-way valve 1# as shown in FIG. 3) and a mixed hydrogen branch (including valves b1, b2 and b3, a unacceptable-purity hydrogen collection tank, a hydrogen buffer tank 2#, a valve by, a valve bx, a hydrogen decompression unit and a hydrogen mixing tank as shown in FIG. 2; or including valves b1, b2 and b3, a unacceptable-purity hydrogen collection tank, a hydrogen buffer tank 2#, a valve by, a valve bx, a hydrogen decompression unit 1#, a hydrogen purification device 2#, a valve b4, a valve b5 and a one-way valve 3# as shown in FIG. 3).

The renewable energy power generation system supplies electric energy to the hydrogen production device. Specifically, an output end of the renewable energy power generation system is in communication with an input end of the hydrogen production device. It should be noted that an output power of the renewable energy power generation system ranges from 0 to 100%. If the output power of the renewable energy power generation system is less than a threshold, such as 30%, purity of hydrogen generated by the hydrogen production device is too low to meet application requirements.

The hydrogen production device includes an electrolytic cell and a post-treatment device. Types of the electrolytic cell and the post-treatment device are not described in detail herein, and any types of electrolytic cell and post-treatment device fall within the protection scope of the present disclosure.

A first gas outlet of the hydrogen generation device is in communication with a first gas inlet of the main hydrogen branch, so that acceptable-purity hydrogen is outputted through the first gas outlet of the hydrogen production device into the first gas inlet of the main hydrogen branch. The acceptable-purity hydrogen is treated in the main hydrogen branch, so that the purity of the hydrogen after treated in the main hydrogen branch meets the application requirements. It should be noted that, the treatment in the main hydrogen branch includes purification, pressurization and the like, which are not described in detail herein, and all fall within the protection scope of the present disclosure.

High-purity hydrogen is outputted through a gas outlet of the main hydrogen branch to a hydrogen storage device, so that the hydrogen storage device stores the high-purity hydrogen. The hydrogen storage device includes a container for storing high-purity hydrogen. High-purity hydrogen stored in the hydrogen storage device flows through a twelfth valve a4 to a hydrogen utilization end, such as a user.

A second gas outlet of the hydrogen generation device is in communication with a first gas inlet of the mixed hydrogen branch, so that unacceptable-purity hydrogen is outputted through the second gas outlet of the hydrogen production device into a first gas inlet of the mixed hydrogen branch. A second gas inlet of the mixed hydrogen branch is in communication with a gas outlet of a hydrogen storage device or a gas outlet of the main hydrogen branch, so that the second gas outlet of mixed hydrogen branch receives the high-purity hydrogen. That is, both unacceptable-purity hydrogen and the high-purity hydrogen flow into the mixed hydrogen branch, so that the high-purity hydrogen and the unacceptable-purity hydrogen are mixed in the mixed hydrogen branch.

In order to make the high-purity hydrogen and the unacceptable-purity hydrogen in the mixed hydrogen branch to be mixed into the acceptable-purity hydrogen, the mixed hydrogen branch is provided with two valves, such as a first valve b2 and a second valve b3 as shown in FIG. 2, or a first valve b2 and a fifth valve bx as shown in FIG. 3, to respectively control volumes of the unacceptable-purity hydrogen and the high-purity hydrogen flows into a hydrogen mixing device in the mixed hydrogen branch, so that the hydrogen mixed by the hydrogen mixing device is acceptable-purity hydrogen. The volume of the high-purity hydrogen flowing into the hydrogen mixing device is controlled to be always greater than the volume of the unacceptable-purity hydrogen flowing into the hydrogen mixing device.

The hydrogen mixing device includes a container for mixing the unacceptable-purity hydrogen and the high-purity hydrogen, such as the hydrogen mixing tank as shown in FIG. 2 or the second hydrogen buffer tank as shown in FIG. 3. In FIG. 2, the hydrogen mixing device doubles as a container for providing hydrogen buffer for a hydrogen compressor. A type of the hydrogen mixing device is not limited herein, which depends on the actual situation and any type of hydrogen mixing device falls within the protection scope of the present disclosure.

As shown in FIG. 2, a gas outlet of the hydrogen mixing device is in communication with a second gas inlet of the main hydrogen branch, so that acceptable-purity hydrogen outputted from the hydrogen mixing device flows into a purification branch in the main hydrogen branch to be purified, so that the outputted hydrogen meets the use requirements. Specifically, after the unacceptable-purity hydrogen and the high-purity hydrogen are mixed by the hydrogen mixing device, the mixed acceptable-purity hydrogen flows through the gas outlet of the hydrogen mixing device into the second inlet of the main hydrogen branch, that is, a gas inlet of the purification branch in the main hydrogen branch.

Alternatively, as shown in FIG. 3, the gas outlet of the hydrogen mixing device is in communication with a gas inlet of a purification branch in the mixed hydrogen branch, so that the acceptable-purity hydrogen outputted from the hydrogen mixing device flows into the purification branch in the mixed hydrogen branch to be purified, so that the outputted hydrogen meets the use requirements. Specifically, after the unacceptable-purity hydrogen and the high-purity hydrogen are mixed by the hydrogen mixing device, the mixed acceptable-purity hydrogen flows through the gas outlet of the hydrogen mixing device into a to gas inlet of the purification branch in the mixed hydrogen branch.

In practice, the hydrogen production system further includes at least one hydrogen storage device (for example, a hydrogen tank as shown in FIG. 2 and a hydrogen storage device as shown in FIG. 3). As shown in FIGS. 2 and 3, a gas outlet of the purification branch in the main hydrogen branch is in communication with a gas inlet of a hydrogen storage device, so that the high-purity hydrogen is outputted through the purification branch in the main hydrogen branch to the hydrogen storage device. As shown in FIG. 3, a gas outlet of the purification branch in the mixed hydrogen branch is in communication with a gas inlet of a hydrogen storage device, so that the high purity hydrogen is outputted through the purification branch in the mixed hydrogen branch to the hydrogen storage device.

It should be noted that, hydrogen with a concentration ranging from 4% to 96% in oxygen has a great risk of explosion and cannot be recycled. However, hydrogen with a concentration between 96% and 99.7% has less risk of explosion and can be recycled. Therefore, hydrogen with concentration greater than a first threshold and less than a second threshold is classified as the unacceptable-purity hydrogen. The first threshold is greater than or equal to 96% and is not limited to 96%. Hydrogen with concentration greater than 99.7% required by a national standard for hydrogen production is crude hydrogen and is classified as the acceptable-purity hydrogen. Therefore, hydrogen with concentration greater than the second threshold is classified as the acceptable-purity hydrogen. The second threshold is greater than or equal to 99.7% and is not limited to 99.7%. The high-purity hydrogen refers to hydrogen with concentration greater than a third threshold, such as hydrogen with concentration greater than or equal to 99.99% after purified by the main hydrogen branch. The third threshold is greater than or equal to 99.99% and is not limited to 99.99%. The first threshold is less than the second threshold, and the second threshold is less than the third threshold, which are not limited in the present disclosure.

In a case that the output power of the renewable energy power generation system is less than 30%, hydrogen generated by the hydrogen production device has low purity and cannot be used directly and effectively, and has poor safety. In this case, if the hydrogen is directly mixed with high-purity hydrogen, it is easy to cause a problem that the concentration of the mixed hydrogen is uncontrollable. In the embodiment, the first valve b2 and the second valve b3 are configured to respectively control the volumes of the unacceptable-purity hydrogen and the acceptable-purity hydrogen into the hydrogen mixing tank, so that the concentration of the hydrogen in the hydrogen mixing tank can be controlled, so as to ensure that concentration of the hydrogen fed back to the main hydrogen branch meets requirements of the acceptable-purity hydrogen, thereby fully recycling the unacceptable-purity hydrogen generated by the hydrogen production device, improving safety performance of the system, avoiding energy waste and improving the utilization of hydrogen energy.

In an embodiment, as shown in FIG. 2, the mixed hydrogen branch includes a recycling branch (including a valve b1 and an unacceptable-purity hydrogen collection tank as shown in FIG. 2), a feedback branch (including a hydrogen buffer tank 2#, a valve by, a valve bx and a hydrogen decompression unit as shown in FIG. 2), a hydrogen mixing tank, a first valve b2 and a second valve b3.

The hydrogen mixing tank serves as the hydrogen mixing device. That is, a gas outlet of the hydrogen mixing tank serves as the gas outlet of the hydrogen mixing device, and a gas inlet of the hydrogen mixing tank serves as the gas inlet of the hydrogen mixing device.

A gas inlet of the recycling branch serves as the first gas inlet of the mixed hydrogen branch and is in communication with the second gas outlet of the hydrogen production device. A gas outlet of the recycling branch is in communication with a first gas inlet of the hydrogen mixing tank through the first valve b2, so that the unacceptable-purity hydrogen is outputted from the second gas outlet of the hydrogen production device through the recycling branch and the first valve b2 to the hydrogen mixing tank. That is, the recycling branch is configured to recycle the unacceptable-purity hydrogen.

The high-purity hydrogen flows through the feedback branch and the second valve b3 to the hydrogen mixing tank. A gas inlet of the feedback branch receives the high-purity hydrogen. In practice, the gas inlet of the feedback branch is in communication with the gas outlet of the main hydrogen branch. Alternatively, the gas inlet of the feedback branch is in communication with the hydrogen storage device, such as a hydrogen tank or other high-purity hydrogen sources.

A gas outlet of the feedback branch is in communication with a second gas inlet of the hydrogen mixing tank through the second valve b3, so that the high-purity hydrogen flows through the feedback branch and the second valve b3 into the second gas inlet of the hydrogen mixing tank.

A gas outlet of the hydrogen mixing tank serves as a gas outlet of the mixed hydrogen branch and is in communication with the second gas inlet of the main hydrogen branch, so that the acceptable-purity hydrogen outputted from the hydrogen mixing tank flows into the purification branch in the main hydrogen branch to be purified.

In practice, a hydrogen purity analyzer AE3 is arranged in the hydrogen mixing tank. The hydrogen purity analyzer AE3 in the hydrogen mixing tank controls the first valve b2. Specifically, when detecting that concentration of hydrogen generated by the hydrogen production device is within an acceptable-purity range, that is, the concentration is greater than or equal to 99.7%, the hydrogen purity analyzer AE3 in the hydrogen mixing tank controls the first valve b2 to be closed. When detecting that the concentration of the hydrogen is not in the acceptable-purity range, such as 96% to 99.7%, the hydrogen purity analyzer AE3 in the hydrogen mixing tank controls the first valve b2 to be open.

Based on the embodiment shown in FIG. 2, the recycling branch includes an unacceptable-purity hydrogen collection tank and a third valve 191.

The unacceptable-purity hydrogen collection tank is a container for collecting unacceptable-purity hydrogen. That is, a gas inlet of the unacceptable-purity hydrogen collection tank receives the unacceptable-purity hydrogen through the third valve b1. The third valve b1 is controlled by a hydrogen purity analyzer AE1 in the hydrogen production device, and is open only when the concentration of the hydrogen generated by the hydrogen production device is within the unacceptable-purity range.

Specifically, a gas inlet of the unacceptable-purity hydrogen collection tank is in communication with a second gas outlet of the hydrogen production device through the third valve b1. A first gas outlet of the unacceptable-purity hydrogen collection tank is in communication with the first gas inlet of the hydrogen mixing tank through the first valve b2, so that the unacceptable-purity hydrogen flows from the unacceptable-purity hydrogen collection tank through the first valve b2 to the hydrogen mixing tank.

The unacceptable-purity hydrogen collection tank is further provided with a second gas outlet and a safety valve, to discharge the hydrogen from the hydrogen production system through the safety valve, that is, to vent hydrogen in the unacceptable-purity hydrogen collection tank (for example, Vent as shown in FIG. 2). A hydrogen purity analyzer AE2 is arranged in the unacceptable-purity hydrogen collection tank, to measure concentration of the hydrogen in the unacceptable-purity hydrogen collection tank.

Specifically, in a case that the hydrogen purity analyzer AE2 in the unacceptable-purity hydrogen collection tank detects that the concentration of the hydrogen in the unacceptable-purity hydrogen collection tank is less than a first threshold, for example, 96%, the hydrogen in the unacceptable-purity hydrogen collection tank is directly vented through the safety valve. In a case that the hydrogen purity analyzer AE2 in the unacceptable-purity hydrogen collection tank detects that the concentration of the hydrogen in the unacceptable-purity hydrogen collection tank is greater than the first threshold and less than or equal to the second threshold, that is, greater than 96% and less than or equal to 99.7%, the hydrogen in the unacceptable-purity hydrogen collection tank is required to be further treated, that is, may be transmitted to the hydrogen mixing device (such as the hydrogen mixing tank as shown in FIG. 2).

Moreover, the second gas outlet of the unacceptable-purity hydrogen collection tank in provided with a safety valve to prevent overpressure of the hydrogen in the unacceptable-purity hydrogen collection tank, so as to improve the safety of the unacceptable-purity hydrogen collection tank. Specifically, in a case of overpressure, the hydrogen in the unacceptable-purity hydrogen collection tank flows through the first gas outlet of the unacceptable-purity hydrogen collection tank and the first valve b2 to the hydrogen mixing tank. In a case of overpressure, that is, a pressure of the hydrogen in the unacceptable-purity hydrogen collection tank is greater than a first preset pressure, the safety valve is open, so that the hydrogen in the unacceptable-purity hydrogen collection tank is discharged from the unacceptable-purity hydrogen collection tank through the safety valve and the second gas outlet of the unacceptable-purity hydrogen collection tank. In a case that the hydrogen in the unacceptable-purity hydrogen collection tank is vented or the pressure of the hydrogen in the unacceptable-purity hydrogen collection tank is less than a second preset pressure, the safety valve is closed. Further a hydrogen pressure detection device is arranged in the unacceptable-purity hydrogen collection tank. The hydrogen pressure detection device is configured to measure a pressure of the hydrogen in the unacceptable-purity hydrogen collection tank. When the pressure of the hydrogen in the unacceptable-purity hydrogen collection tank is greater than the first preset pressure, the safety valve is open. When the pressure of the hydrogen in the unacceptable-purity hydrogen collection tank is less than the second preset pressure, the safety valve is closed. The first preset pressure is greater than or equal to the second preset pressure. Specific values of the first preset pressure and the second preset pressure are not limited herein, and depend on the actual situation, and any suitable values fall within the protection scope of the present disclosure.

Specifically, in practice, the hydrogen production device is further provided with a third gas outlet. Non-recyclable hydrogen is discharged from the hydrogen production system through the third gas outlet. That is, hydrogen generated by the hydrogen production device is vented through the third gas outlet (such as Vent as shown in FIG. 2 or FIG. 3). The hydrogen purity analyzer AE1 is arranged in the hydrogen production device. According to the concentration of the hydrogen measured by the hydrogen purity analyzer AE1, the hydrogen is vented through the third gas outlet of the hydrogen production device in a case that the hydrogen easily results in a risk of explosion and cannot be recycled, so as to avoid explosion. In a case that the concentration of the hydrogen is within the acceptable-purity range, the acceptable-purity hydrogen flows to the main hydrogen branch through the first gas outlet of the hydrogen production device, so that the acceptable-purity hydrogen is purified in the main hydrogen branch to meet the application requirements. In a case that the concentration of the hydrogen is within the unacceptable-purity range, the unacceptable-purity hydrogen flows to the recycling branch through the second gas outlet of the hydrogen production device, so that the unacceptable-purity hydrogen is recycled.

The recycling branch includes the third valve b1. The main hydrogen branch includes a seventh valve a1. In a case that the hydrogen purity analyzer AE1 detects that the concentration of the hydrogen generated by the hydrogen production device is within the unacceptable-purity range, for example, ranges from 96% to 99.7%, the hydrogen purity analyzer AE1 in the hydrogen production device controls the third valve b1 to be open. In a case that the concentration of the hydrogen generated by the hydrogen production device is not within the unacceptable-purity range, the hydrogen purity analyzer AE1 in the hydrogen production device controls the third valve b1 to be closed.

In practice, the feedback branch includes a second hydrogen buffer tank (for example, a hydrogen buffer tank 2# as shown in FIG. 2), a fourth valve by, a first hydrogen decompression unit (for example, a hydrogen decompression unit as shown in FIG. 2) and a fifth valve bx.

The high-purity hydrogen flows through a gas inlet of the second hydrogen buffer tank and the fourth valve by. Specifically, the gas inlet of the second hydrogen buffer tank is in communication with the gas outlet of the main hydrogen branch through the fourth valve by, the first hydrogen decompression unit and the fifth valve bx. Alternatively, the gas inlet of the second hydrogen buffer tank is in communication with a high-purity hydrogen source, such as the hydrogen storage device (for example, the hydrogen tank as shown in FIG. 2), through the fourth valve by, the first hydrogen decompression unit and the fifth valve bx. A gas outlet of the second hydrogen buffer tank is in communication with the second gas inlet of the hydrogen mixing tank through the second valve b3.

The first hydrogen decompression unit is any decompression unit that ensures a pressure of hydrogen in a subsequent branch to maintain a certain value. The first hydrogen decompression unit is not limited herein, and depends on the actual situation, and any suitable decompression unit falls within the protection scope of the present disclosure.

In practice, the feedback branch may include no hydrogen decompression unit. In such case, the fourth valve by is not required. In addition, a sixth valve (not shown in the drawings) is arranged between the hydrogen storage device and the gas outlet of the main hydrogen branch. Specifically, the gas inlet of the second hydrogen buffer tank is in communication with the gas outlet of the main hydrogen branch through the fifth valve bx. Alternatively, the gas inlet of the second hydrogen buffer tank is in communication with a high-purity hydrogen source, such as the hydrogen storage device, through the fifth valve bx. The second hydrogen buffer tank is a container for buffering the hydrogen, and stores the acceptable-purity hydrogen. The second hydrogen buffer tank is not limited herein, and depends on the actual situation, and any suitable container falls within the protection scope of the present disclosure.

It should be noted that, the gas outlet of the main hydrogen branch, the gas inlet of the feedback branch and the gas inlet of the hydrogen storage device converge. In a case that the feedback branch includes no first hydrogen decompression unit, the gas outlet of the main hydrogen branch is in communication with the gas inlet of the hydrogen storage device through the sixth valve, and is in communication with the gas inlet of the feedback branch. Specifically, in a case that the high-purity hydrogen is from the main hydrogen branch, that is, in a case that the hydrogen generated when the renewable energy power generation system is under rated power serves as the high-purity hydrogen, the sixth valve is closed and the fourth valve by is open, so that the high-purity hydrogen in the main hydrogen branch flows into the feedback branch. In addition, the high-purity hydrogen may flows into the second hydrogen buffer tank based on a pressure difference between the main hydrogen branch and the feedback branch.

In the embodiment as shown in FIG. 2, the main hydrogen branch includes a first hydrogen buffer tank (for example, a hydrogen buffer tank 1# as shown in FIG. 2), a first hydrogen purification device, a seventh valve a1, an eighth valve a2, a ninth valve a3 and a tenth valve b5.

A first gas inlet of the first hydrogen buffer tank is in communication with the first gas outlet of the hydrogen production device through the seventh valve a1. A second gas inlet of the first hydrogen buffer tank receives the acceptable-purity hydrogen from the hydrogen mixing tank through the tenth valve b5. A gas outlet of the first hydrogen buffer tank is in communication with a gas inlet of the first hydrogen purification device through the eighth valve a2. A gas outlet of the first hydrogen purification device is in communication with the hydrogen storage device (such as the hydrogen tank as shown in FIG. 2) through the ninth valve a3. The first hydrogen buffer tank is a container for buffering the hydrogen, and stores the crude hydrogen. The first hydrogen purification device is configured to purify the crude hydrogen. Types of the first hydrogen buffer tank and the first hydrogen purification device are not limited herein, and depend on the actual situation, and any suitable hydrogen buffer tank and hydrogen purification device fall within the protection scope of the present disclosure.

Specifically, an operation process of the hydrogen production system is described by taking the structure shown in FIG. 2 as an example.

(1) In a case that the output power of the renewable energy power generation system is low, the hydrogen generated by the hydrogen production system flows through the hydrogen production device, the recycling branch, the hydrogen mixing tank, the main hydrogen branch, and the feedback branch/the hydrogen storage device (such as the hydrogen tank as shown in FIG. 2) sequentially. The specific transmission process includes the following steps 1 to 5.

In step 1, in a case that the hydrogen generated by the hydrogen production device is the unacceptable-purity hydrogen, the hydrogen purity analyzer AE1 in the hydrogen production device controls the third valve b1 to be open, and the unacceptable-purity hydrogen flows to the unacceptable-purity hydrogen collection tank.

In step 2, the first valve b2 is open, and the unacceptable-purity hydrogen in the unacceptable-purity hydrogen collection tank flows through the first valve b2 to the hydrogen mixing tank. In addition, the second valve b3 is open, and the high-purity hydrogen in the second hydrogen buffer tank flows through the second valve b3 to the hydrogen mixing tank. The high-purity hydrogen and the unacceptable-purity hydrogen are mixed in the hydrogen mixing tank, so that the concentration of the unacceptable-purity hydrogen is improved.

It should be noted that both the fourth valve by and the fifth valve bx are open, so that the high-purity hydrogen flows through the fifth valve bx, the first hydrogen decompression unit, the fourth valve by, the second hydrogen buffer tank and the second valve b3 to the hydrogen mixing tank. It should be noted that the volume of the mixed high-purity hydrogen is greater than the volume of the mixed unacceptable-purity hydrogen, so that the concentration of the mixed hydrogen meets the requirements of the acceptable-purity hydrogen.

In step 3, in a case that the hydrogen purity analyzer AE3 in the hydrogen mixing tank detects that the concentration of the hydrogen meets the requirements of the acceptable-purity hydrogen, the first valve b2 is closed, so that the unacceptable-purity hydrogen in the recycling branch cannot flow to the hydrogen mixing tank through the first gas inlet of the hydrogen mixing tank.

In step 4, the second valve b3 is closed, so that the high-purity hydrogen in the feedback branch cannot flow to the hydrogen mixing tank through the second gas inlet of the hydrogen mixing tank.

Step 3 and step 4 are performed in parallel. Alternatively, step 4 is performed a preset time period later than step 3 is performed.

In step 5, when the pressure of the hydrogen in the hydrogen mixing tank is stable, an eleventh valve b4 is open and the hydrogen compressor starts up, so that the acceptable-purity hydrogen in the hydrogen mixing tank flows to the first hydrogen buffer tank (that is, the hydrogen buffer tank 1# as shown in FIG. 2) after a pressure of the acceptable-purity hydrogen is increased by the hydrogen compressor, and then flows through the eighth valve a2, the first hydrogen purification device and the ninth valve a3 to the hydrogen storage device (that is, the hydrogen tank as shown in FIG. 2), where the acceptable-purity hydrogen is further purified by the first hydrogen purification device. Finally, the acceptable-purity hydrogen flows through a twelfth valve a4 to a hydrogen utilization end, such as the user.

(2) With the output power of the renewable energy power generation system increases, the concentration of the hydrogen generated by the hydrogen production device gradually increases. When the concentration of the hydrogen generated by the hydrogen production device increases to meet the requirements of the acceptable-purity hydrogen, the seventh valve a1 is open, so that the acceptable-purity hydrogen flows through the seventh valve a1 to the first hydrogen buffer tank (that is, the hydrogen buffer tank 1# as shown in FIG. 2). In addition, the eighth valve a2 is open, so that the acceptable-purity hydrogen flows to the first hydrogen purification device. After the hydrogen is purified by the first hydrogen purification device, the ninth valve a3 is open, so that the high-purity hydrogen flows from the first hydrogen purification device to the hydrogen storage tank. Alternatively, when the fifth valve in the feedback branch by is open, the high-purity hydrogen flows to the feedback branch.

In practice, the hydrogen production device further includes the hydrogen compressor. The hydrogen compressor is configured to increase a pressure of the hydrogen from a former hydrogen storage device. The former hydrogen storage device is related to an arrangement position of the hydrogen compressor.

The hydrogen compressor may have multiple arrangement positions. Two of the arrangement positions are described as follows.

(1) A gas inlet of the hydrogen compressor directly is in communication with the gas outlet of the first hydrogen buffer tank, or the gas inlet of the hydrogen compressor is in communication with the gas outlet of the first hydrogen buffer tank through a valve. A gas outlet of the hydrogen compressor directly is in communication with the gas inlet of the first hydrogen purification device, or the gas outlet of the hydrogen compressor is in communication with the gas inlet of the first hydrogen purification device through a valve. Specifically, the gas inlet of the hydrogen compressor directly is in communication with the gas outlet of the first hydrogen buffer tank, and the gas outlet of the hydrogen compressor is in communication with the gas inlet of the first hydrogen purification device through a valve. Alternatively, the gas inlet of the hydrogen compressor is in communication with the gas outlet of the first hydrogen buffer tank through a valve, and the gas outlet of the hydrogen compressor directly is in communication with the gas inlet of the first hydrogen purification device. Alternatively, the gas inlet of the hydrogen compressor is in communication with the gas outlet of the first hydrogen buffer tank through a valve, and the gas outlet of the hydrogen compressor is in communication with the gas inlet of the first hydrogen purification device through a valve. That is, the former hydrogen storage device of the hydrogen compressor is the first hydrogen buffer tank. The hydrogen compressor increases the pressure of the hydrogen from the first hydrogen buffer tank.

(2) The gas inlet of the hydrogen compressor is in communication with the gas outlet of the hydrogen mixing tank through the eleventh valve b4. The gas outlet of the hydrogen compressor is in communication with the second gas inlet of the main hydrogen branch through the tenth valve b5. That is, the gas outlet of the hydrogen compressor is in communication with the second gas inlet of the first hydrogen buffer tank (that is, the hydrogen buffer tank 1# as shown in FIG. 2) through the tenth valve b5. The hydrogen compressor is configured to increase the pressure of the hydrogen. A type of the hydrogen compressor is not limited herein, and depends on the actual situation, and any suitable hydrogen compressor falls within the protection scope of the present disclosure. That is, the former hydrogen storage device of the hydrogen compressor is the hydrogen mixing tank. The hydrogen compressor increases the pressure of the hydrogen from the hydrogen mixing tank.

It should be noted that the hydrogen compressor may be turned off, to save energy, avoid waste of the hydrogen and protect the device. The hydrogen production system is provided with a hydrogen compressor arranged in the main hydrogen branch or a hydrogen compressor arranged between the main hydrogen branch and the hydrogen mixing tank. Alternatively, the hydrogen production system is provided with a hydrogen compressor arranged in the main hydrogen branch and a hydrogen compressor arranged between the main hydrogen branch and the hydrogen mixing tank. However, in a preferred embodiment, in order to reduce the cost, the hydrogen production system is only provided with one hydrogen compressor to increase of the pressure of the hydrogen.

In an embodiment, as shown in FIG. 3, the mixed hydrogen branch includes a recycling branch (including a first valve b1 and an unacceptable-purity hydrogen collection tank as shown in FIG. 3), a feedback branch, a second hydrogen buffer tank (for example, a hydrogen buffer tank 2# as shown in FIG. 3), a fifth valve bx and the purification branch (including valves b4, b5, a hydrogen purification device 2# and a one-way valve 3# as shown in FIG. 3).

The second hydrogen buffer tank serves as the hydrogen mixing device. That is, a gas outlet of the second hydrogen buffer tank serves as the gas outlet of the hydrogen mixing device, and a gas inlet of the second hydrogen buffer tank serves as the gas inlet of the hydrogen mixing device.

A gas inlet of the recycling branch serves as the first gas inlet of the mixed hydrogen branch and is in communication with the second gas outlet of the hydrogen production device. A gas outlet of the recycling branch is in communication with a first gas inlet of the second hydrogen buffer tank through the first valve b2, so that the unacceptable-purity hydrogen flows from the hydrogen production device to the second hydrogen buffer tank through the second gas outlet of the hydrogen production device, the recycling branch, the first valve b2 and the first gas inlet of the second hydrogen buffer tank sequentially.

The high-purity hydrogen flows through the gas inlet of the feedback branch, so that the high-purity hydrogen flows to the second hydrogen buffer tank through the feedback branch, the fifth valve bx and a second gas inlet of the second hydrogen buffer tank. In practice, the gas inlet of the feedback branch is in communication with a gas outlet of the main hydrogen branch. Alternatively, the gas inlet of the feedback branch is in communication with a high-purity hydrogen source such as the hydrogen storage tank. In practice, the feedback branch includes a passage for receiving the high-purity hydrogen.

The gas outlet of the second hydrogen buffer tank is in communication with a gas inlet of the purification branch, so that the acceptable-purity hydrogen flows from the second hydrogen buffer tank is purified by the purification branch in the mixed hydrogen branch.

The hydrogen production device is further provided with a third gas outlet. The third gas outlet is configured to discharge non-recyclable hydrogen from the hydrogen production system. That is, the non-recyclable hydrogen is vented through the third gas outlet (such as Vent as shown in FIG. 3). A hydrogen purity analyzer AE1 is arranged in the hydrogen production device. The specific process of the hydrogen purity analyzer AE1 is similar to that in the above embodiment. Therefore, details may refer to the above embodiment, and are not repeated herein and fall within the protection scope of the present disclosure.

A hydrogen purity analyzer AE2 is arranged in the second hydrogen buffer tank. The hydrogen purity analyzer AE3 in the hydrogen mixing tank controls the first valve b2. The specific process and arrangement of the hydrogen purity analyzer is similar to the hydrogen purity analyzer in the above hydrogen mixing tank. Therefore, details may refer to the above embodiment, and are not repeated herein and fall within the protection scope of the present disclosure.

In practice, the recycling branch includes an unacceptable-purity hydrogen collection tank, a third valve hi, a second hydrogen decompression unit (for example, a hydrogen decompression unit 2# as shown in FIG. 3), a second valve b3 and a second one-way valve (for example, a one-way valve 2# as shown in FIG. 3).

A gas inlet of the unacceptable-purity hydrogen collection tank is in communication with a second gas outlet of the hydrogen production device through the third valve b1, so that the gas inlet of the unacceptable-purity hydrogen collection tank receives the unacceptable-purity hydrogen from the second gas outlet of the hydrogen production device through the third valve b1. A first gas outlet of the unacceptable-purity hydrogen collection tank is in communication with a gas inlet of the second hydrogen decompression unit through the first valve b2, so that the unacceptable-purity hydrogen in the unacceptable-purity hydrogen collection tank flows into the second hydrogen decompression unit. A gas outlet of the second hydrogen decompression unit is in communication with the first gas inlet of the second hydrogen buffer tank through the second valve b3 and the second one-way valve, so that the unacceptable-purity hydrogen flows to the second hydrogen buffer tank through the first gas inlet of the second hydrogen buffer tank.

The third valve b1 is controlled by the hydrogen purity analyzer AE1 in the hydrogen production device, and is open only when the concentration of the hydrogen generated by the hydrogen production device is within the unacceptable-purity range. The unacceptable-purity hydrogen collection tank is further provided with a second gas outlet and the second gas outlet is provided with a safety valve, to discharge the hydrogen from the hydrogen production system through the safety valve, that is, to vent the hydrogen in the unacceptable-purity hydrogen collection tank (such as Vent as shown in FIG. 3). The specific operation process may refer to the above embodiment, and is not repeated herein and falls within the protection scope of the present disclosure.

It should be noted that the mixed hydrogen in the second hydrogen buffer tank cannot flow into the unacceptable-purity hydrogen collection tank due to the second one-way valve, so as to avoid waste of energy.

In practice, the purification branch in the mixed hydrogen branch includes a second hydrogen purification device, an eleventh valve b4, a tenth valve b5, and a third one-way valve (for example, a one-way valve 3# as shown in FIG. 3).

A gas inlet of the eleventh valve b4 serves as the gas inlet of the purification branch in the mixed hydrogen branch, and is in communication with the gas outlet of the second hydrogen buffer tank. A gas outlet of the eleventh valve b4 is in communication with a gas inlet of the second hydrogen purification device, so that the gas inlet of the second hydrogen purification device is in communication with the gas outlet of the second hydrogen buffer tank through the eleventh valve b4. A gas outlet of the third one-way valve serves as the gas outlet of the purification branch and is in communication with a hydrogen storage device. A gas inlet of the third one-way valve is in communication with a gas outlet of the tenth valve b5. The gas inlet of the tenth valve b5 is in communication with a gas outlet of the second hydrogen purification device, so that the gas outlet of the second hydrogen purification device is in communication with a gas inlet of the hydrogen storage device through the tenth valve b5 and the third one-way valve.

In practice, the main hydrogen branch includes a first hydrogen buffer tank (for example, a hydrogen buffer tank 1# as shown in FIG. 3), a first hydrogen purification device, a seventh valve a1, an eighth valve a2, a ninth valve a3 and a first one-way valve (for example, a one-way valve 1# as shown in FIG. 3).

A gas inlet of the seventh valve a1 serves as the first gas inlet of the main hydrogen branch. A first gas inlet of the first hydrogen buffer tank is in communication with a gas outlet of the seventh valve, so that the first gas inlet of the first hydrogen buffer tank is in communication with the first gas outlet of the hydrogen production device through the seventh valve a1. A gas outlet of the first hydrogen buffer tank is in communication with a gas inlet of the first hydrogen purification device through the eighth valve a2. The high-purity hydrogen flows from the first hydrogen purification device through a gas outlet of the first hydrogen purification device. The gas outlet of the first hydrogen purification device is in communication with a hydrogen storage device through the ninth valve a3 and the first one-way valve. The first hydrogen buffer tank is a container for buffering the hydrogen, and stores the high-purity hydrogen. The first hydrogen purification device is configured to purify the crude hydrogen. Types of the first hydrogen buffer tank and the first hydrogen purification device are not limited herein, and depend on the actual situation, and any suitable hydrogen buffer tank and hydrogen purification device fall within the protection scope of the present disclosure.

It should be noted that the gas outlet of the first hydrogen purification device serves as a first gas outlet of the main hydrogen branch and is in communication with the second gas inlet of the mixed hydrogen branch, that is, the gas inlet of the feedback branch. A gas outlet of the first one-way valve serves as a second gas outlet of the main hydrogen branch and is in communication with the hydrogen storage device. As long as the first hydrogen purification device can output the high-purity hydrogen to the hydrogen storage device and the second gas inlet of the mixed hydrogen branch can receive the high-purity hydrogen, the main hydrogen branch may be in other structure, which is not described in detail herein and falls within the protection scope of the present disclosure.

Figure 4:
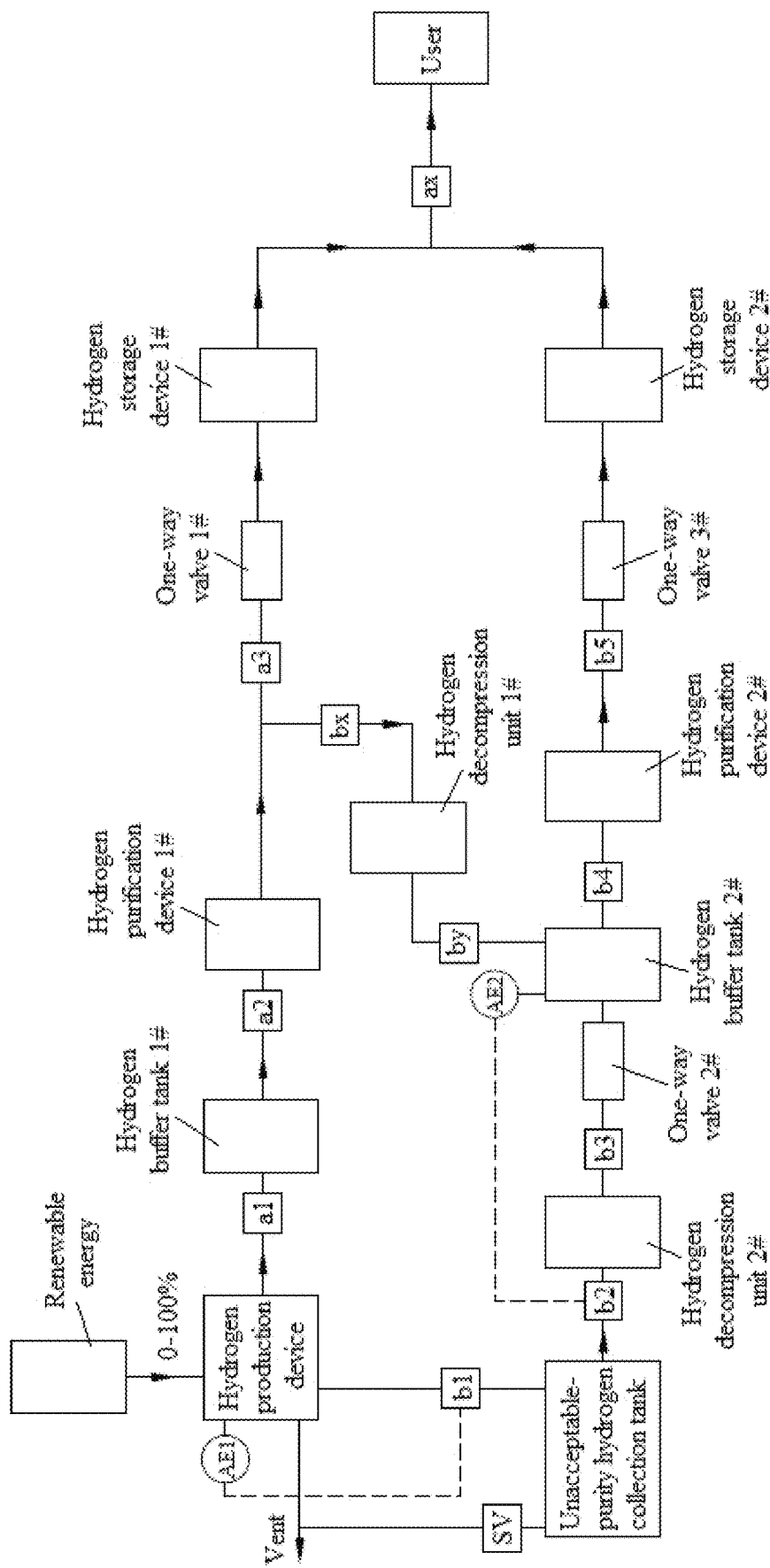
FIG. 4 is a schematic diagram of a hydrogen production system according to another embodiment of the present disclosure.

In practice, the hydrogen production system is provided with multiple hydrogen storage devices (as shown in FIG. 4). That is, the hydrogen purification device is in one to one correspondence with the hydrogen storage device. Alternatively, the hydrogen production system is provided with one hydrogen storage device (as shown in FIG. 3). That is, the high-purity hydrogen from all hydrogen purification devices flows to one hydrogen storage device. The number of the hydrogen storage device is not limited herein, and depends on the actual situation, and any suitable number of the hydrogen storage device falls within the protection scope of this present disclosure. It should be noted that a valve ax shown in FIG. 4 and a valve a4 shown in FIGS. 2 to 3 are both a twelfth valve for controlling hydrogen transmitted to the user.

It should be noted that all the valves in FIG. 2 and FIG. 3, such as the first to the twelfth valves (that is, valves b1 to b5, bx, by, a1 to a4 as shown in FIG. 2 and FIG. 3) can be open and closed. Types of these valves are not limited herein, and depend on the actual situation, and any suitable valve fall within the protection scope of the present disclosure. FIG. 2 and FIG. 3 show only illustrative structures of the hydrogen production system, and corresponding parts may be combined and replaced with each other, which is not described in detail herein, and any suitable combination and replacement fall within the protection scope of the present disclosure.

Specifically, the operation process of the hydrogen production system is described by taking the structure shown in FIG. 3 as an example.

(1) In a case that the output power of the renewable energy power generation system is low, the hydrogen generated by the hydrogen production system flows through the hydrogen production device, the recycling branch, the second hydrogen buffer tank, the purification branch in the mixed hydrogen branch, and the hydrogen storage device sequentially. The specific transmission process includes the following steps 1 to 5.

In step 1, in a case that the hydrogen generated by the hydrogen production device is the unacceptable-purity hydrogen, the hydrogen purity analyzer AE1 in the hydrogen production device controls the third valve b1 to be open, so that the unacceptable-purity hydrogen flows to the unacceptable-purity hydrogen collection tank.

In step 2, the first valve b2 is open and the second valve b3 is open, so that the unacceptable-purity hydrogen in the unacceptable-purity hydrogen collection tank flows through the first valve b2, the second hydrogen decompression unit and the second one-way valve (that is, the one-way valve 2# as shown in FIG. 2) to the hydrogen mixing tank. In addition, the fourth valve by and the fifth valve bx are open, so that the high-purity hydrogen flows through the fifth valve bx, the first hydrogen decompression unit and the fourth valve by to the second hydrogen buffer tank. The high-purity hydrogen and the unacceptable-purity hydrogen are mixed in the hydrogen mixing tank, so that the concentration of the unacceptable-purity hydrogen is improved.

It should be noted that the volume of the mixed high-purity hydrogen flowing into the hydrogen mixing tank is greater than the volume of the mixed unacceptable-purity hydrogen flowing into the hydrogen mixing tank, so that the concentration of the mixed hydrogen meets the requirements of the acceptable-purity hydrogen.

In step 3, when the hydrogen purity analyzer AE2 in the second hydrogen buffer tank detects that the concentration of the hydrogen meets the requirements of the acceptable-purity hydrogen, the first valve b2 is closed, so that the unacceptable-purity hydrogen in the recycling branch cannot flows to the second hydrogen buffer tank through the first gas inlet of the second hydrogen buffer tank.

In step 4, the fifth valve bx is closed, so that the high-purity hydrogen in the feedback branch cannot flow into the second hydrogen buffer tank.

Step 3 and step 4 are performed in parallel. Alternatively, step 4 is performed a preset time period later than step 3 is performed.

In step 5, when the pressure of the hydrogen in the second hydrogen buffer tank is stable, the eleventh valve b4 is open, so that the acceptable-purity hydrogen in the second hydrogen buffer tank flows to the second hydrogen purification device (that is, the hydrogen purification device 2# as shown in FIG. 3), and then flows through the tenth valve b5 and the third one-way valve (that is, the one-way valve 3# as shown in FIG. 3) to a hydrogen storage device, where the acceptable-purity hydrogen is further purified by the second hydrogen purification device. Finally, the acceptable-purity hydrogen is transmitted through the twelfth valve a4 to a hydrogen utilization end, such as a user.

(2) With the output power of the renewable energy power generation system increases, the concentration of the hydrogen generated by the hydrogen production device gradually increases. When the concentration of the hydrogen generated by the hydrogen production device increases to meet the requirements of the acceptable-purity hydrogen, the seventh valve a1 is opened, so that the acceptable-purity hydrogen flows through the seventh valve a1 to the first hydrogen buffer tank (that is, the hydrogen buffer tank 1# as shown in FIG. 3). In addition, the eighth valve a2 is open, so that the acceptable-purity hydrogen flows to the first hydrogen purification device (that is, the hydrogen purification device 1# as shown in FIG. 3). After the hydrogen is purified by the first hydrogen purification device, the ninth valve a3 is opened, the high-purity hydrogen flows from the first hydrogen purification device to the hydrogen storage tank. Alternatively, after the hydrogen is purified by the first hydrogen purification device, and when the fifth valve by in the feedback branch is open, the high-purity hydrogen flows to the feedback branch.

A method for controlling a hydrogen production system is provided according to an embodiment of the present disclosure. The method is applicable to the hydrogen production system according to any one of the above embodiments. For the specific structure and operation principle of the hydrogen production system, reference is made to the above embodiments, which are not repeated herein and fall within the protection scope of the present disclosure.

Figure 5:
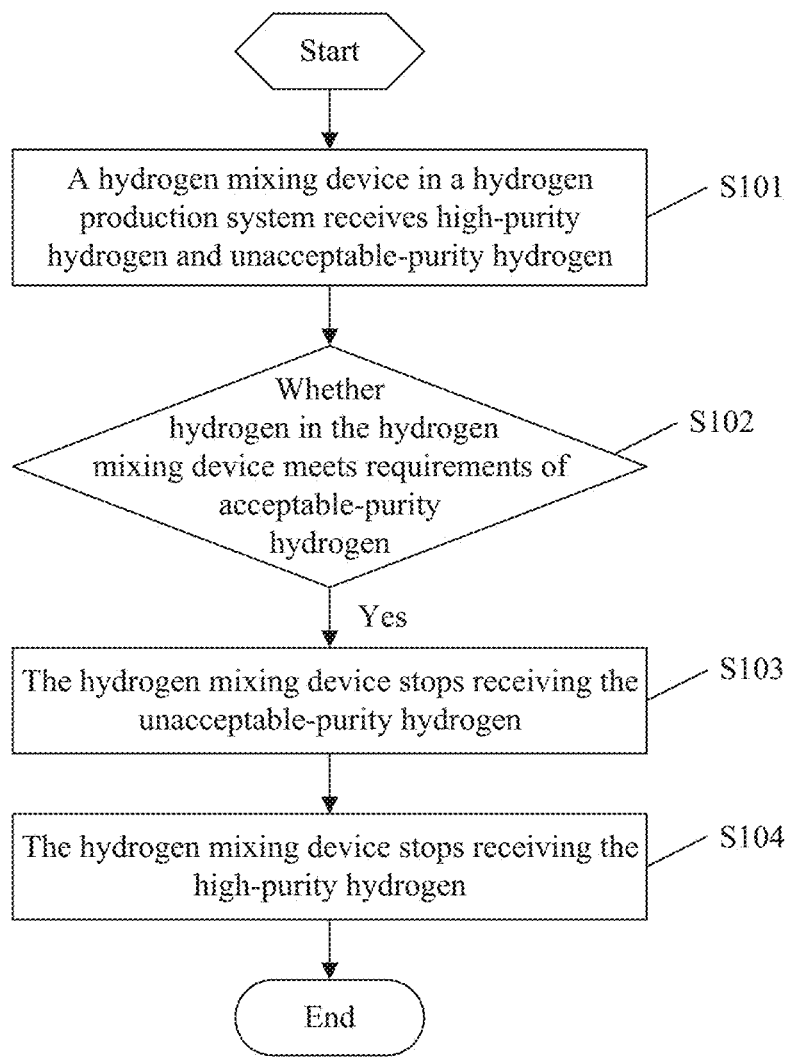
FIG. 5 is a flow chart of a method for controlling a hydrogen production system according to an embodiment of the present disclosure.

As shown in FIG. 5, the method for controlling a hydrogen production system includes the following steps S101 to S104.

In step S101, a hydrogen mixing device in the hydrogen production system receives high-purity hydrogen and unacceptable-purity hydrogen.

As shown in FIG. 2, a first valve b2 is open, so that the unacceptable-purity hydrogen in a recycling branch flows to a first inlet of a hydrogen mixing tank. A second valve b3 is open, so that the high-purity hydrogen in a feedback branch flows to a second inlet of the hydrogen mixing tank.

Specifically, the first valve b2 is open, so that the unacceptable-purity hydrogen in the unacceptable-purity hydrogen collection tank flows through the first valve b2 to the hydrogen mixing tank. In addition, the second valve b3 is open, so that the high-purity hydrogen in the second hydrogen buffer tank flows through the second valve b3 to the hydrogen mixing tank The high-purity hydrogen and the unacceptable-purity hydrogen are mixed in the hydrogen mixing tank, so that concentration of the unacceptable-purity hydrogen is improved. It should be noted that both the fourth valve by and the fifth valve bx are open, so that the high-purity hydrogen flows through the fifth valve bx, the first hydrogen decompression unit, the fourth valve by, the second hydrogen buffer tank and the second valve b3 to the hydrogen mixing tank. It should be noted that volume of the high-purity hydrogen is greater than volume of the unacceptable-purity hydrogen, so that the concentration of the mixed hydrogen meets the requirements of the acceptable-purity hydrogen.

As shown in FIG. 3, the first valve b2 and the second valve b3 are open, so that the unacceptable-purity hydrogen in the recycling branch flows to the second hydrogen buffer tank through a first gas inlet of the second hydrogen buffer tank. The fourth valve by and the fifth valve bx are open, so that the high-purity hydrogen flows to the second hydrogen buffer tank through the second gas inlet of the second hydrogen buffer tank.

Specifically, the first valve b2 and the second valve b3 are open, so that the unacceptable-purity hydrogen in the unacceptable-purity hydrogen collection tank flows through the first valve b2 and the second valve b3 to the second hydrogen buffer tank. In addition, the fourth valve by and the fifth valve bx are open, so that the high-purity hydrogen flows through the fifth valve bx, the first hydrogen decompression unit and the fourth valve by and the second gas inlet of the second hydrogen buffer tank to the second hydrogen buffer tank. It should be noted that the volume of the high-purity hydrogen is greater than the volume of the unacceptable-purity hydrogen, so that the concentration of the mixed hydrogen meets the requirements of the acceptable-purity hydrogen.

In addition, a source of the high-purity hydrogen is not limited. The high-purity hydrogen is outputted from the main hydrogen branch, that is, the high-purity hydrogen is generated by the renewable energy power generation system in a case that the output power of the renewable energy power generation system is greater than or equal to 30%. Alternatively, the high-purity hydrogen is from the hydrogen storage device or from the outside of the hydrogen production system. The source of the high-purity hydrogen is not limited herein, and depends on the actual situation and ant suitable source of the high-purity hydrogen falls within the protection scope of the present disclosure.

In step S102, it is determined whether the hydrogen in the hydrogen mixing device meets requirements of the acceptable-purity hydrogen.

Specifically, it is determined whether concentration of the hydrogen in the hydrogen mixing device is greater than or equal to a second threshold, for example, 99.7%. If the concentration of the hydrogen in the hydrogen mixing device is less than the second threshold, it is determined that the hydrogen in the hydrogen mixing device does not meet the requirements of the acceptable-purity hydrogen.

As shown in FIG. 2, a hydrogen purity analyzer AE3 in the hydrogen mixing device measures concentration of the mixed hydrogen in the hydrogen mixing device. In a case that the hydrogen purity analyzer AE3 in the hydrogen mixing device detects that the concentration of the hydrogen is within a concentration range of crude hydrogen, that is, is within an acceptable-purity range, it is determined that the hydrogen in the hydrogen mixing device meets the requirements of the acceptable-purity hydrogen. The process in a structure to shown in FIG. 3 is the same as that in FIG. 2, and is not described in detail herein and falls within the protection scope of the present disclosure.

If the concentration of the hydrogen in the hydrogen mixing device meets the requirements of the acceptable-purity hydrogen, step S103 is performed. If the concentration of the hydrogen in the hydrogen mixing device does not meet the requirements of the acceptable-purity hydrogen, it is determined to perform step S101 first or perform step S103 first according to a pressure of the hydrogen in the hydrogen mixing device.

In step S103, the hydrogen mixing device stops receiving the unacceptable-purity hydrogen.

As shown in FIG. 2, it should be noted that in a case that the hydrogen purity analyzer AE3 in the hydrogen mixing device detects that the concentration of the hydrogen is within the concentration range of the crude hydrogen, the first valve b2 is closed, so that the unacceptable-purity hydrogen in the recycling branch cannot flow to the hydrogen mixing device through the first gas inlet of the hydrogen mixing device. The process in the structure shown in FIG. 3 is the same as that in FIG. 2, and is not described in detail herein and falls within the protection scope of the present disclosure.

In step S104, the hydrogen mixing device stops receiving the high-purity hydrogen.

As shown in FIG. 2, the second valve b3 is closed, so that the high-purity hydrogen in the feedback branch cannot flow to the hydrogen mixing device through the second gas inlet of the hydrogen mixing device. It should be noted that valves in the feedback branch, such as the fourth valve by and the fifth valve bx, are also closed to avoid an excessive pressure in the second hydrogen buffer tank (as shown in FIG. 2). As shown in FIG. 3, the fifth valve bx is closed so that the feedback branch stops receiving the high-purity hydrogen.

In practice, in the case that the hydrogen in the hydrogen mixing device meets the requirements of the acceptable-purity hydrogen, step S103 and step S104 are performed simultaneously. Alternatively, step 4 is performed a preset time period later than step 3 is performed. The preset time period is any reasonable period, as long as that step S103 is performed after step S104, which is not described in detail herein and any suitable period falls within the protection scope of the present disclosure. Performing modes of step S103 and step to S104 are not limited herein, and depend on the actual situation and fall within the protection scope of the present disclosure.

In practice, after step S104, that is, after the hydrogen mixing device stops receiving the high-purity hydrogen, the method further includes a step as follows. After the pressure of the hydrogen in the hydrogen mixing device is stable, the hydrogen is outputted from the hydrogen mixing device to a gas inlet of the purification branch in the main hydrogen branch of the hydrogen production system, or transmitted to a gas inlet of the purification branch in a mixed hydrogen branch.

Figure 6:
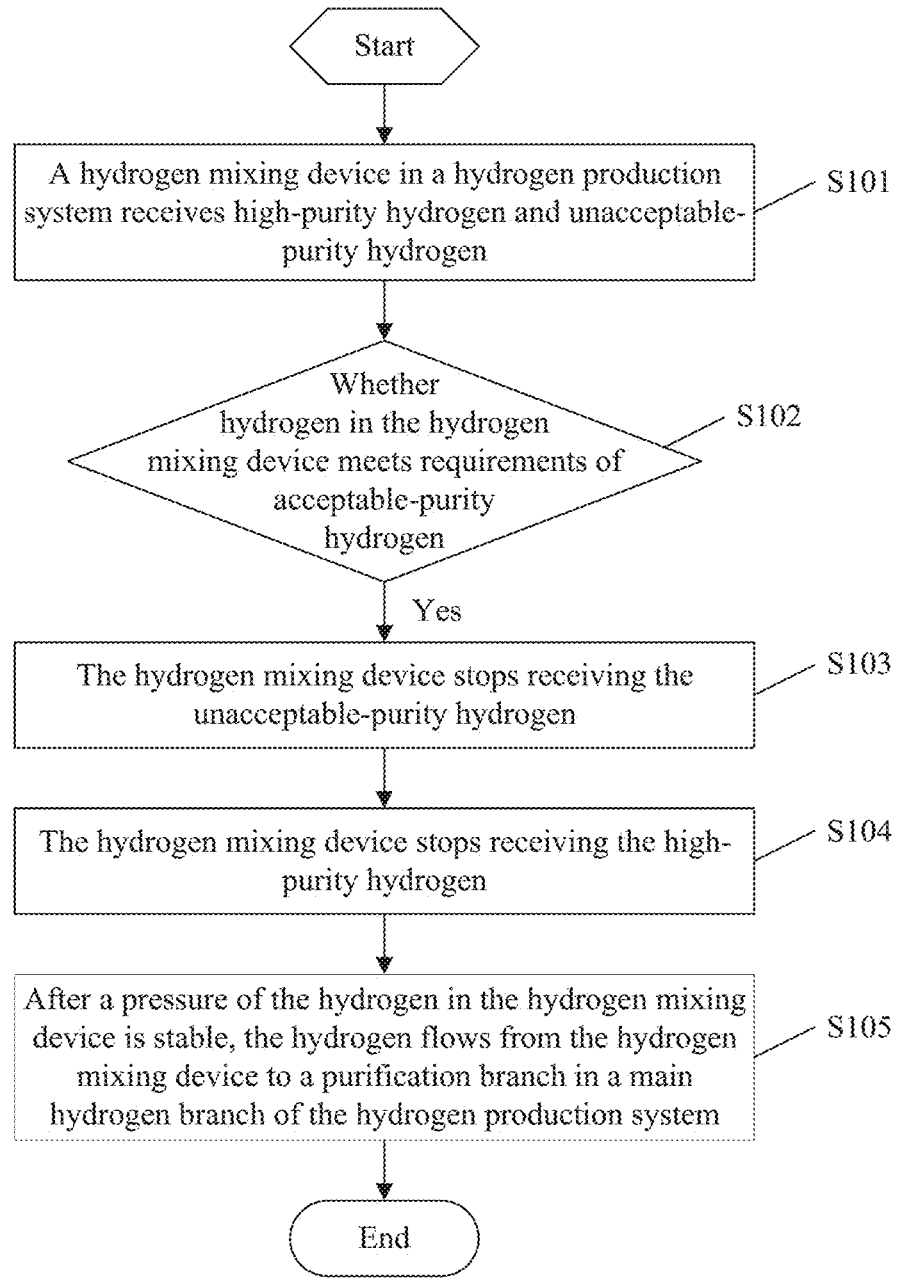
FIG. 6 is a flow chart of a method for controlling a hydrogen production system according to another embodiment of the present disclosure.

Specifically, in a case that the gas outlet of the hydrogen mixing device is communication with the purification branch in the main hydrogen branch, as shown in FIG. 6, after step S104, that is, after the hydrogen mixing device stops receiving the high-purity hydrogen and the unacceptable-purity hydrogen, the method further includes the following step S105.

In step S105, after the pressure of the hydrogen in the hydrogen mixing device is stable, the hydrogen is outputted from the hydrogen mixing device to a gas inlet of the purification branch in the main hydrogen branch of the hydrogen production system.

As shown in FIG. 2, after the pressure of the hydrogen in the hydrogen mixing tank is stable, the eleventh valve b4 is open and the hydrogen compressor starts up, so that the crude hydrogen in the hydrogen mixing tank is transmitted to a first hydrogen buffer tank (for example, a hydrogen buffer tank 1# as shown in FIG. 2) after a pressure of the crude hydrogen is increased by the hydrogen compressor. Then, the crude hydrogen flows through an eighth valve a2, a first hydrogen purification device and a ninth valve a3 to the hydrogen storage device, where the crude hydrogen is purified in the first hydrogen purification device. Finally, the purified hydrogen is transmitted through a twelfth valve a4 to a hydrogen utilization end, such as a user.

Figure 7:
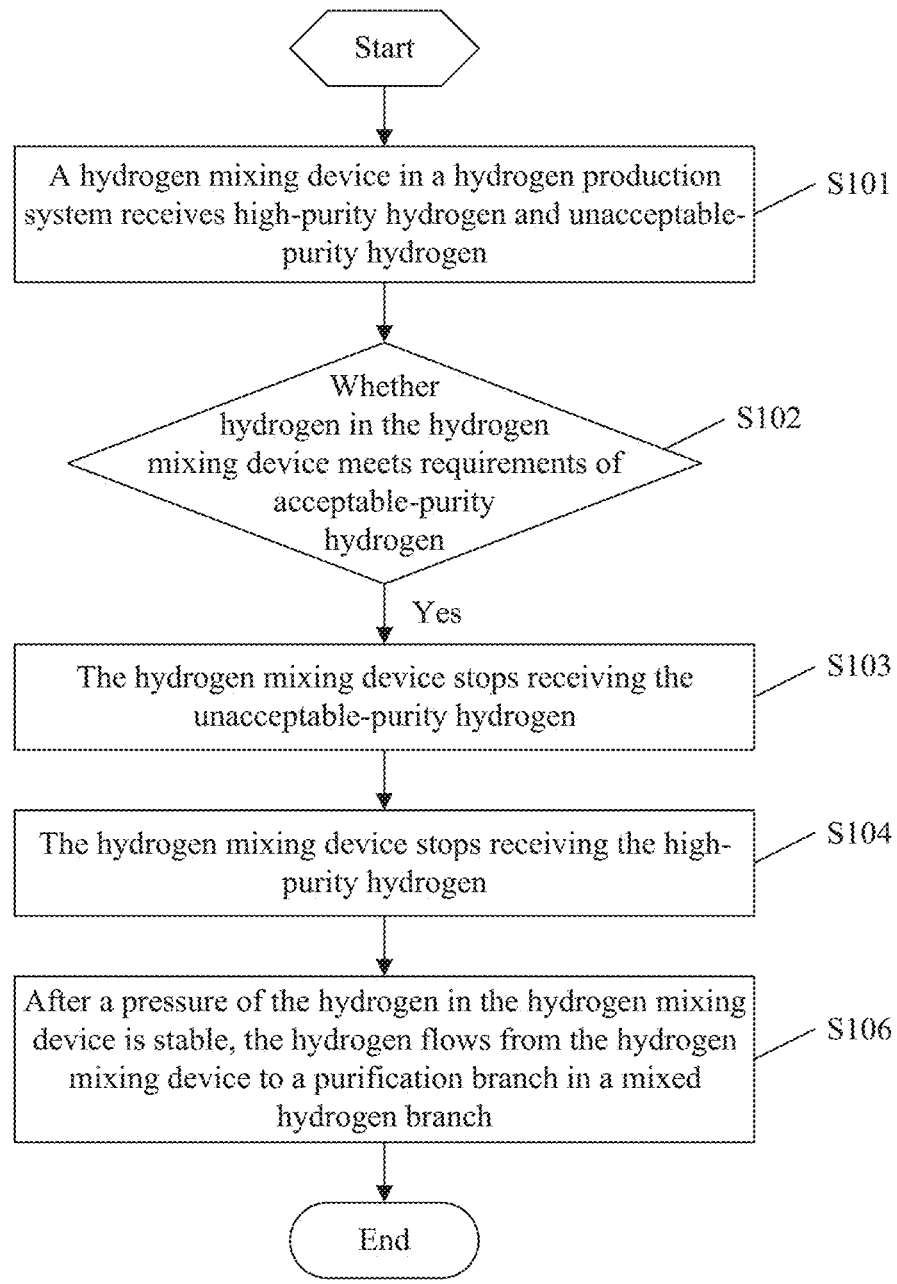
FIG. 7 is a flow chart of a method for controlling a hydrogen production system according to another embodiment of the present disclosure.

Alternatively, in a case that the gas outlet of the hydrogen mixing device is in communication with the purification branch in the mixed hydrogen branch, as shown in FIG. 7, after step S104, that is, after the hydrogen mixing device stops receiving the high-purity hydrogen and the unacceptable-purity hydrogen, the method further includes the following step S106.

In step S106, after the pressure of the hydrogen in the hydrogen mixing device is stable, the hydrogen flows from the hydrogen mixing device to the purification branch in the mixed hydrogen branch.

As shown in FIG. 3, after the pressure of the hydrogen in the hydrogen mixing device is stable, the eleventh valve b4 is open, so that the crude hydrogen in the second hydrogen buffer tank flows to the second hydrogen purification device (for example, the hydrogen purification device 24 as shown in FIG. 3), and then flows through the tenth valve b5 and the third one-way valve (for example, the one-way valve 2# as shown in FIG. 3) to the hydrogen storage device, Finally, the crude hydrogen flows through the twelfth valve a4 to a hydrogen utilization end, such as a user end.

In the embodiment, since the volume of the high-purity hydrogen is always greater than the volume of the unacceptable-purity hydrogen, the concentration of the mixed hydrogen is within the acceptable-purity range without the unacceptable-purity hydrogen, so as to avoid waste of energy.

In practice, in a case that a hydrogen purity analyzer is arranged in the hydrogen production device of the hydrogen production system, the method further includes the following steps (1), (2) and (3). In (1), In (1), before and after any one of the above steps, in a case that the hydrogen in the hydrogen production device is the acceptable-purity hydrogen, the acceptable-purity hydrogen flows through a first gas outlet of the hydrogen production device to the main hydrogen branch of the hydrogen production system.

As show in FIG. 2, in a case that the hydrogen in the hydrogen production device is acceptable-purity hydrogen, that is, concentration of the hydrogen in the hydrogen production device is greater than a second threshold, for example, 99.7%, the seventh valve a1 is open, so that the acceptable-purity hydrogen in the hydrogen production device flows through the first gas outlet of the hydrogen production device to the main hydrogen branch of the hydrogen production system. That is, the acceptable-purity hydrogen flows through the seventh valve a1, the first hydrogen buffer tank (that is, the hydrogen buffer tank 1#), the eighth valve a2, the first hydrogen purification device, and the ninth valve a3 to the hydrogen storage device, and then flows through the twelfth valve a4 to a hydrogen utilization end, such as a user end. In addition, the third valve b1 is closed, so that the main hydrogen branch of the hydrogen generation system stops receiving the hydrogen. The process in the structure shown in FIG. 3 is the same as that in FIG. 2, and is not described in detail herein and falls within the protection scope of the present disclosure.

In (2), before step S101, in a case that the hydrogen in the hydrogen production device is the unacceptable-purity hydrogen, the unacceptable-purity hydrogen flows through a second gas outlet of the hydrogen production device to the recycling branch of the hydrogen production system.

As shown in FIG. 2, in the case that the hydrogen in the hydrogen production device is the unacceptable-purity hydrogen, that is, the concentration of the hydrogen in the hydrogen production device is within the unacceptable-purity range, for example, ranging from 96% to 99.7%, the third valve b1 is open, so that the unacceptable-purity hydrogen in the hydrogen production device flows through the second gas outlet of the hydrogen production device to the recycling branch of the hydrogen production system. In addition, the seventh valve a1, the eighth valve a8 and the ninth valve a3 are closed, so that the main hydrogen branch of the hydrogen generation system stops receiving the hydrogen. The process in the structure shown in FIG. 3 is the same as that in FIG. 2, and is not described in detail herein and falls within the protection scope of the present disclosure.

In (3), before and after any one of the above steps, in a case that the concentration of the hydrogen in the hydrogen production device is less than a preset unacceptable-purity hydrogen concentration, that is, a first threshold, the hydrogen is discharged from the hydrogen production system through a third gas outlet of the hydrogen production device.

As shown in FIG. 2, in the case that the concentration of the hydrogen in the hydrogen production device is less than the first threshold, that is, less than 96%, the hydrogen is vented directly. In addition, the seventh valve a1 and the third valve b1 are closed, so that the main hydrogen branch and the recycling branch of the hydrogen production system stop receiving the hydrogen. The process in the structure shown in FIG. 3 is the same as that in FIG. 2, and is not described in detail herein and falls within the protection scope of the present disclosure.

It should be noted that in (1) and (2), no hydrogen is discharged through the third gas outlet of the hydrogen production device. Only when the concentration of the hydrogen in the hydrogen production device is less than the preset unacceptable-purity hydrogen to concentration, the hydrogen in the hydrogen production device is vented through the third gas outlet of the hydrogen production device.

In practice, in the case that a hydrogen purity analyzer is arranged in the unacceptable-purity hydrogen collection tank of the recycling branch of the hydrogen production system, after the unacceptable-purity hydrogen collection tank receives the hydrogen, the method further includes steps as follows.

In a case that the concentration of the hydrogen in the unacceptable-purity hydrogen collection tank is less than the preset unacceptable-purity hydrogen concentration, the hydrogen in the unacceptable-purity hydrogen collection tank is discharged from the hydrogen production system through a second gas outlet of the unacceptable-purity hydrogen collection tank.

In a case that the concentration of the hydrogen in the unacceptable-purity hydrogen collection tank is greater than or equal to the preset unacceptable-purity hydrogen concentration, the hydrogen in the unacceptable-purity hydrogen collection tank flows through a first gas outlet of the unacceptable-purity hydrogen collection tank, the first valve of the hydrogen production system and the first gas inlet of the hydrogen mixing device to the hydrogen mixing device.

The features described in the embodiments according to the present disclosure may be replaced or combined with each other. The similar parts among the embodiments can be referred to each other. Each of the embodiments emphasizes the differences from others. In particular, since the method or method embodiment are basically similar to the system embodiment, the description thereof is relatively simple, and for relevant matters, references may be made to the description of the system. The system and embodiments of the system described above are only illustrative. Units described as separate components may be or may not be physically separate. Components shown as units may be or may not be physical units, that is, may be located in one place or may be distributed to multiple network units. Some or all of the modules may be selected to implement the embodiments of the present disclosure according to actual requirements. Those skilled in the art may understand and implement the embodiments of the present disclosure without any creative work.

Those skilled in the art may further understand that units and steps described in combination with the disclosed embodiments may be implemented by electronic hardware, to computer software or a combination thereof. In order to clearly describe interchangeability of the hardware and the software, the units and steps in each embodiment are generally described above based on functions. Whether the functions are implemented by the hardware or the software is determined by specific applications of the technical solutions and design constraints. For each of the specific applications, those skilled in the art may adopt a specific implementation to realize the functions described above, and the implementation should fall within the scope of the present disclosure.

Based on the above description of the disclosed embodiments, those skilled in the art can implement or carry out the present disclosure. It is apparent for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:
1. A hydrogen production system, comprising:
a renewable energy power generation system;
a hydrogen production device;
a main hydrogen branch;
a mixed hydrogen branch; and
at least one hydrogen storage device, wherein the renewable energy power generation system is configured to supply electric energy to the hydrogen production device for hydrogen production;

the hydrogen production device is configured to: discharge acceptable-purity hydrogen to a first gas inlet of the main hydrogen branch through a first gas outlet of the hydrogen production device; and discharge unacceptable-purity hydrogen to a first gas inlet of the mixed hydrogen branch through a second gas outlet of the hydrogen production device;

the mixed hydrogen branch is configured to receive high-purity hydrogen through a second gas inlet of the mixed hydrogen branch;

the mixed hydrogen branch comprises two valves, wherein one of the two valves is configured to control a volume of the high-purity hydrogen flowing into a hydrogen mixing device in the mixed hydrogen branch, and the other of the two valves is configured to control a volume of the unacceptable-purity hydrogen flowing into the hydrogen mixing device in the mixed hydrogen branch, to control mixed hydrogen in the hydrogen mixing device to be the acceptable-purity hydrogen; and the at least one hydrogen storage device is configured to receive high-purity hydrogen from at least one of a purification branch in the main hydrogen branch or a purification branch in the mixed hydrogen branch, wherein the acceptable-purity hydrogen in the hydrogen mixing device is discharged to the purification branch in the main hydrogen branch, or the purification branch in the mixed hydrogen branch.

2. The hydrogen production system according to claim 1, wherein the mixed hydrogen branch further comprises a recycling branch and a feedback branch, wherein the two valves comprise a first valve and a second valve;
the hydrogen mixing device is a hydrogen mixing tank;
the hydrogen production device is configured to discharge the unacceptable-purity hydrogen to a first gas inlet of the hydrogen mixing tank through the second gas outlet of the hydrogen production device, the recycling branch and the first valve;

the feedback branch is configured to convey the high-purity hydrogen to a second gas inlet of the hydrogen mixing tank through the second valve; and a gas outlet of the hydrogen mixing tank is in communication with a second gas inlet of the main hydrogen branch, wherein the acceptable-purity hydrogen discharged from the hydrogen mixing tank is purified in the purification branch in the main hydrogen branch.

3. The hydrogen production system according to claim 2, wherein the recycling branch comprises an unacceptable-purity hydrogen collection tank and a third valve, wherein the unacceptable-purity hydrogen collection tank is configured to receive the unacceptable-purity hydrogen through the third valve and a gas inlet of the unacceptable-purity hydrogen collection tank; and a first gas outlet of the unacceptable-purity hydrogen collection tank is in communication with the first gas inlet of the hydrogen mixing tank through the first valve.

4. The hydrogen production system according to claim 2, wherein the feedback branch comprises a second hydrogen buffer tank and a fifth valve, wherein the second hydrogen buffer tank is configured to receive the high-purity hydrogen through a gas inlet of the second hydrogen buffer tank and the fifth valve; and a gas outlet of the second hydrogen buffer tank is in communication with the second gas inlet of the hydrogen mixing tank through the second valve.

5. The hydrogen production system according to claim 1, wherein the mixed hydrogen branch further comprises a recycling branch, a feedback branch, a second hydrogen buffer tank, and a purification branch, wherein the two valves comprise a first valve and a fifth valve;
the second hydrogen buffer tank serves as the hydrogen mixing device;
the hydrogen production device is configured to discharge the unacceptable-purity hydrogen to a first gas inlet of the second hydrogen buffer tank through the second gas outlet of the hydrogen production device, the recycling branch and the first valve;

the feedback branch is configured to convey the high-purity hydrogen to a second gas inlet of the second hydrogen buffer tank through the fifth valve; and the second hydrogen buffer tank is configured to discharge the acceptable-purity hydrogen through a gas outlet of the second hydrogen buffer tank, and the purification branch in the mixed hydrogen branch is configured to purify the acceptable-purity hydrogen discharged from the gas outlet of the second hydrogen buffer tank.

6. The hydrogen production system according to claim 5, wherein the recycling branch comprises a third valve, an unacceptable-purity hydrogen collection tank, a second hydrogen decompression unit, a second valve and a second one-way valve, wherein the unacceptable-purity hydrogen collection tank is configured to receive the unacceptable-purity hydrogen through the third valve and a gas inlet of the unacceptable-purity hydrogen collection tank;

a first gas outlet of the unacceptable-purity hydrogen collection tank is in communication with a gas inlet of the second hydrogen decompression unit through the first valve; and a gas outlet of the second hydrogen decompression unit is in communication with the first gas inlet of the second hydrogen buffer tank through the second valve and the second one-way valve.

7. The hydrogen production system according to claim 2, wherein a hydrogen purity analyzer is provided in the hydrogen mixing device; and the first valve is controlled based on a measurement result of the hydrogen purity analyzer.

8. The hydrogen production system according to claim 3, wherein a hydrogen purity analyzer is arranged in the unacceptable-purity hydrogen collection tank; and the unacceptable-purity hydrogen collection tank is configured to discharge hydrogen out of the hydrogen production system through a second gas outlet of the unacceptable-purity hydrogen collection tank and a safety valve.

9. The hydrogen production system according to claim 3, wherein a hydrogen purity analyzer is arranged in the hydrogen production device, wherein the third valve is controlled based on a measurement result of the hydrogen purity analyzer in the hydrogen production device; and the hydrogen production device is configured to discharge hydrogen out of the hydrogen production system through a third gas outlet of the hydrogen production device.

10. The hydrogen production system according to claim 4, wherein the feedback branch further comprises a first hydrogen decompression unit and a fourth valve, wherein
 the second hydrogen buffer tank is configured to receive the high-purity hydrogen from the main hydrogen branch through the fourth valve, the first hydrogen decompression unit and the fifth valve.

11. The hydrogen production system according to claim 4, wherein
 a sixth valve is arranged between the at least one hydrogen storage device and a gas outlet of the main hydrogen branch.

12. The hydrogen production system according to claim 5, wherein the purification branch in the mixed hydrogen branch comprises an eleventh valve, a second hydrogen purification device, a tenth valve and a third one-way valve, wherein
 a gas inlet of the second hydrogen purification device is in communication with the gas outlet of the second hydrogen buffer tank through the eleventh valve; and
 a gas outlet of the second hydrogen purification device is in communication with a gas inlet of one of the at least one hydrogen storage device through the tenth valve and the third one-way valve.

13. The hydrogen production system according to claim 2, wherein the main hydrogen branch comprises a seventh valve, a first hydrogen buffer tank, an eighth valve, a first hydrogen purification device and a ninth valve, wherein
 a gas inlet of the seventh valve serves as the first gas inlet of the main hydrogen branch;
 a first gas inlet of the first hydrogen buffer tank is in communication with a gas outlet of the seventh valve;
 a gas outlet of the first hydrogen buffer tank is in communication with a gas inlet of the first hydrogen purification device through the eighth valve;
 a second gas inlet of the first hydrogen buffer tank serves as the second gas inlet of the main hydrogen branch; and
 a gas outlet of the first hydrogen purification device is in communication with a gas inlet of one of the at least one hydrogen storage device through the ninth valve.

14. The hydrogen production system according to claim 5, wherein the main hydrogen branch comprises a seventh valve, a first hydrogen buffer tank, an eighth valve, a first hydrogen purification device, a ninth valve and a first one-way valve, wherein
 a gas inlet of the seventh valve serves as the first gas inlet of the main hydrogen branch;
 a first gas inlet of the first hydrogen buffer tank is in communication with a gas outlet of the seventh valve;
 a gas outlet of the first hydrogen buffer tank is in communication with a gas inlet of the first hydrogen purification device through the eighth valve; and
 the first hydrogen purification device is configured to discharge the high-purity hydrogen through a gas outlet of the first hydrogen purification device, and the gas outlet of the first hydrogen purification device is in communication with a gas inlet of one of the at least one hydrogen storage device through the ninth valve and the first one-way valve.

15. A method for controlling a hydrogen production system, wherein the method is applied to the hydrogen production system according to claim 1, and the method comprises:
 receiving high-purity hydrogen and unacceptable-purity hydrogen by a hydrogen mixing device in a mixed hydrogen branch of the hydrogen production system;
 determining whether hydrogen in the hydrogen mixing device meets requirements of acceptable-purity hydrogen;
 stopping receiving the unacceptable-purity hydrogen by the hydrogen mixing device when the hydrogen in the hydrogen mixing device meets the requirements of the acceptable-purity hydrogen; and
 stopping receiving the high-purity hydrogen by the hydrogen mixing device.

16. The method for controlling a hydrogen production system according to claim 15, wherein
 the stopping receiving the unacceptable-purity hydrogen and the stopping receiving the high-purity hydrogen are performed simultaneously; or
 the stopping receiving the unacceptable-purity hydrogen is performed a preset time period earlier than the stopping receiving the high-purity hydrogen is performed.

17. The method for controlling a hydrogen production system according to claim 15, wherein, after the stopping receiving the high-purity hydrogen, the method further comprises:
 discharging, when a pressure of the hydrogen in the hydrogen mixing device is stable, the hydrogen from the hydrogen mixing device to a gas inlet of the purification branch in the main hydrogen branch of the hydrogen production system, or to a gas inlet of the purification branch in the mixed hydrogen branch.

18. The method for controlling a hydrogen production system according to claim 15, wherein a hydrogen purity analyzer is arranged in a hydrogen production device of the hydrogen production system, wherein
 the method further comprises: discharging, in a case that hydrogen in the hydrogen production device is the acceptable-purity hydrogen, the acceptable-purity hydrogen from the hydrogen production device to the main hydrogen branch of the hydrogen production system through a first gas outlet of the hydrogen production device; and
 before receiving high-purity hydrogen and unacceptable-purity hydrogen by the hydrogen mixing device in the mixed hydrogen branch of the hydrogen production system, the method further comprises: discharging, in a case that the hydrogen in the hydrogen production device is the unacceptable-purity hydrogen, the unacceptable-purity hydrogen from the hydrogen production device to a recycling branch of the hydrogen production system through a second gas outlet of the hydrogen production device.

19. The method for controlling a hydrogen production system according to claim 18, further comprising:
 discharging, in a case that the concentration of the hydrogen in the hydrogen production device is less than a preset unacceptable-purity hydrogen concentration, the hydrogen out of the hydrogen production system through a third gas outlet of the hydrogen production device.

20. The method for controlling a hydrogen production system according to claim 17, wherein a hydrogen purity analyzer is arranged in an unacceptable-purity hydrogen collection tank of a recycling branch of the hydrogen production system, wherein after the unacceptable-purity hydrogen collection tank receives the hydrogen, the method further comprises:
 discharging, in a case that concentration of the hydrogen in the unacceptable-purity hydrogen collection tank is less than a preset unacceptable-purity hydrogen concentration, the hydrogen in the unacceptable-purity hydrogen collection tank out of the hydrogen production system through a second gas outlet of the unacceptable-purity hydrogen collection tank; and discharging, in a case that concentration of the hydrogen in the unacceptable-purity hydrogen collection tank is greater than or equal to the preset unacceptable-purity hydrogen concentration, the hydrogen in the unacceptable-purity hydrogen collection tank through a first gas outlet of the unacceptable-purity hydrogen collection tank and a first valve of the hydrogen production system to a first gas inlet of the hydrogen mixing device.

\* \* \* \* \*